United States Patent
Maruo et al.

(10) Patent No.: US 7,594,495 B2
(45) Date of Patent: Sep. 29, 2009

(54) ELECTRONIC THROTTLE VALVE CONTROL SYSTEM AND TWO-WHEELED MOTOR VEHICLE

(75) Inventors: Keisuke Maruo, Shizuoka (JP); Tomoaki Kishi, Shizuoka (JP); Takeshi Matsuda, Shizuoka (JP); Masato Yokoi, Shizuoka (JP); Naoya Yamaguchi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 10/578,630

(22) PCT Filed: Nov. 9, 2004

(86) PCT No.: PCT/JP2004/016608

§ 371 (c)(1),
(2), (4) Date: Feb. 23, 2007

(87) PCT Pub. No.: WO2005/047671

PCT Pub. Date: May 26, 2005

(65) Prior Publication Data

US 2007/0169744 A1 Jul. 26, 2007

(30) Foreign Application Priority Data

Nov. 12, 2003 (JP) ............................. 2003-382033
Apr. 7, 2004 (JP) ............................. 2004-113570

(51) Int. Cl.
F02D 41/00 (2006.01)
(52) U.S. Cl. ..................... 123/399; 701/114; 701/115

(58) Field of Classification Search ................. 123/350, 123/339.25, 339.14, 399; 701/114, 115
See application file for complete search history.

(56) References Cited

U.S. PATENT DOCUMENTS

| 4,411,231 A * | 10/1983 | Watanabe et al. ....... 123/339.25 |
| 6,799,554 B2 * | 10/2004 | Furuta ......................... 123/350 |
| 2004/0244771 A1 * | 12/2004 | Hoshino et al. ............. 123/350 |

FOREIGN PATENT DOCUMENTS

| JP | 59-153945 | 9/1984 |
| JP | 07-054677 | 2/1995 |
| JP | 2000-145481 | 5/2000 |
| JP | 2003-065140 | 3/2003 |
| JP | 2003-343286 | 12/2003 |

* cited by examiner

*Primary Examiner*—Stephen K Cronin
*Assistant Examiner*—Keith Coleman
(74) *Attorney, Agent, or Firm*—Hogan & Hartson LLP

(57) ABSTRACT

An electronic throttle valve control system prevents rapid rotation of a throttle valve when the control system has a failure. A throttle valve controls the amount of intake air to an internal combustion engine, an electric motor drives the throttle valve, and a control section controls the electric motor. The throttle valve has an urging mechanism for urging the throttle valve in the closing direction. The control section shifts the electric motor to a regenerative mode when the control system has a failure to control the speed at which the throttle valve is rotated in the closing direction by the urging force of the urging mechanism. The throttle valve is therefore rotated slowly in the closing direction by the urging force of the urging mechanism and then held in a predetermined opening position.

25 Claims, 17 Drawing Sheets

ELECTRONIC THROTTLE VALVE CONTROL SYSTEM AND TWO-WHEELED MOTOR VEHICLE

CROSS-REFERENCE TO RELATED APPLICATIONS

This application is a national phase of PCT application No. PCT/JP2004/016608, filed Nov. 9, 2004, the entire contents of which are incorporated by reference. This application also claims benefit of priority under 35 USC § 119 to Japanese Patent Application No. 2003-382033 filed Nov. 12, 2003 and Japanese Patent Application No. 2004-113570 filed Apr. 7, 2004, the entire contents of which are incorporated by reference.

TECHNICAL FIELD

The present invention relates to an electronic throttle valve control system and, more particularly, to an electronic throttle valve control system prepared for a failure in the system.

BACKGROUND ART

An electronic throttle valve system for electronically controlling the opening of a throttle valve to adjust the amount of intake air to an engine (internal combustion engine) can reduce emission and fuel consumption and has been used in some four-wheeled motor vehicles.

Such an electronic throttle valve system is equipped with a function which stops the driving of the throttle valve by an electric motor and returns the throttle valve to the fully closed position with the urging force of a spring when the control system has a failure. The engine is thereby maintained in such a state that a failure operation can be conducted and the vehicle can be driven to a place.

When a bypass line is provided so that a certain amount of air can be sucked into the engine even when the throttle valve is returned to the fully closed position by the urging force of a spring, the engine can be maintained in such a state that a failure operation can be conducted.

Patent Document 1 discloses a method of rotating a throttle valve and holding it in a predetermined opening position by urging forces of a spring for urging the throttle valve in the closing direction and another spring for urging the throttle valve in the opening direction without a bypass line.

The speed, at which a throttle valve is rotated in the closing direction by the urging force of a spring when the control system has a failure, is very high. Thus, the output of the engine is rapidly decreased. In the case of a four-wheeled passenger vehicle, a driver does not feel a change in the behavior of the vehicle even when the engine output is rapidly decreased since the vehicle is heavy in weight. In the case of a two-wheeled motor vehicle which is light in weight, however, the rider feels a change in the behavior of the vehicle.

Patent Document 2 discloses a method of closing a throttle valve gently by applying a resistance to the rotation of the throttle valve urged in the closing direction by a spring to prevent rapid rotation of the throttle valve. A rapid decrease in the engine output can be thus avoided and the vehicle does not make jerky movements even when running in low gear. As the means for applying a resistance to the rotation of the throttle valve (damping mechanism), an electronic damper using an electroviscous fluid is used.

Patent Document 3 discloses an example in which an electronic throttle valve system is applied to a two-wheeled motor vehicle.

Patent document 1: JP-A-2003-201866
Patent document 2: JP-A-Hei 6-248979
Patent document 3: JP-A-2002-106368

DISCLOSURE OF THE INVENTION

Problem to be Solved by the Invention

Although the method disclosed in Patent Document 2 is excellent in being able to prevent rapid rotation of the throttle valve, means for applying a resistance to the rotation of the throttle valve must be attached to the valve shaft of the throttle valve. Also, when an electroviscous damper is used as the damping means, means for applying an electric field to the electroviscous fluid to increase the viscous drag of the electroviscous fluid when the control system has a failure must be provided.

In the case of a two-wheeled motor vehicle, however, it is physically difficult to install such damping means since, unlike a four-wheeled motor vehicle, there is a limit to the housing space available. Also, when an electronic damper such as an electroviscous damper is used, the electronic damper must also control itself in association with the control system having a failure. This causes problems of complexity of the control system and an increase in cost.

The present invention has been made in view of the above points and it is, therefore, an object of the present invention to provide an electronic throttle valve control system which requires no additional housing space and which can prevent rapid rotation of a throttle valve when the control system has a failure.

Means for Solving the Problem

According to the present invention, an electronic throttle valve control system has: a throttle valve for controlling the amount of intake air to an internal combustion engine; an electric motor for driving the throttle valve and a control section for controlling the electric motor. The throttle valve has an urging mechanism for urging the throttle valve in the closing direction, and the control section shifts the electric motor to a regenerative mode to control the speed at which the throttle valve is rotated in the closing direction by the urging force of the urging mechanism when the control system has a failure.

In a preferred embodiment, the throttle valve is rotated in the closing direction by the urging force of the urging mechanism and then held in a predetermined opening position when the control system has a failure.

According to the present invention, another electronic throttle valve control system has a throttle valve for controlling the amount of intake air to an internal combustion engine; an electric motor for driving the throttle valve; and a control section for controlling the electric motor. The throttle valve has a first urging mechanism for urging the throttle valve in the closing direction and a second urging mechanism for urging the throttle valve in the opening direction, and the control section shifts the electric motor to a regenerative mode to control the speed at which the throttle valve is rotated in the closing direction by the relative urging force of the first and second urging mechanisms when the control system has a failure.

In a preferred embodiment, the throttle valve is rotated in the closing or opening direction by the relative urging force of the first and second urging mechanisms and then held in a predetermined opening position when the control system has a failure.

Preferably, the internal combustion engine is maintained in such a state that a failure operation can be conducted when the throttle valve is held in the predetermined opening position.

According to the present invention, another electronic throttle valve control system has a throttle valve for controlling the amount of intake air to an internal combustion engine; an electric motor for driving the throttle valve; and a control section for controlling the electric motor. The control section shifts the electric motor to a regenerative mode to control the rotation of the throttle valve when the control system has a failure.

In a preferred embodiment, the throttle valve is held in the opening position where it is when the control system has a failure.

In a preferred embodiment, the control section cuts off a power from a power supply to the electric motor and then shifts the electric motor to a regenerative mode.

In a preferred embodiment, the urging mechanism is constituted of a mechanism having a spring.

In a preferred embodiment, the electronic throttle valve control system further comprises a throttle operation mechanism for use in driving the throttle valve manually so that the throttle valve can be rotated in the closing direction when the control system has a failure.

A two-wheeled motor vehicle according to the present invention is characterized by comprising the above electronic throttle valve control system.

EFFECTS OF THE INVENTION

According to the electronic throttle valve control system of the present invention, when the control system has a failure, the electric motor for actuating the throttle valve is shifted to a regenerative mode so that a resistive force can be applied to the throttle valve urged to rotate with the urging force and attenuate the rotating speed of the throttle valve. Thus, rapid rotation of the throttle valve can be prevented. Since the electric motor is used as a actuator source for opening and closing the throttle valve during normal times, there is no need to provide an additional mechanism which is activated only when the control system has a failure. Also, the electric motor can be shifted to the regenerative mode easily by making a short circuit between both terminals of the electric motor to allow it to serve as an electric generator. Thus, there is no need for an additional housing space and rapid rotation of the throttle valve can be prevented by simple control when the electronic throttle valve control system has a failure.

When a first urging mechanism for urging the throttle valve in the closing direction and a second urging mechanism for urging the throttle valve in the opening direction are provided, the throttle valve can be held in an opening position uniquely determined by the relative urging force of the first and second urging mechanisms and the internal combustion engine can therefore be maintained in such a state that an optimum failure operation can be conducted when the control system has a failure.

Even if no urging mechanism is provided, the throttle valve can be held in the opening position where it is, by shifting the electric motor to a regenerative state when the control system has a failure. Thus, the rider does not feel a sudden change in the behavior of the vehicle.

DESCRIPTION OF REFERENCE NUMERALS

Figure 1:
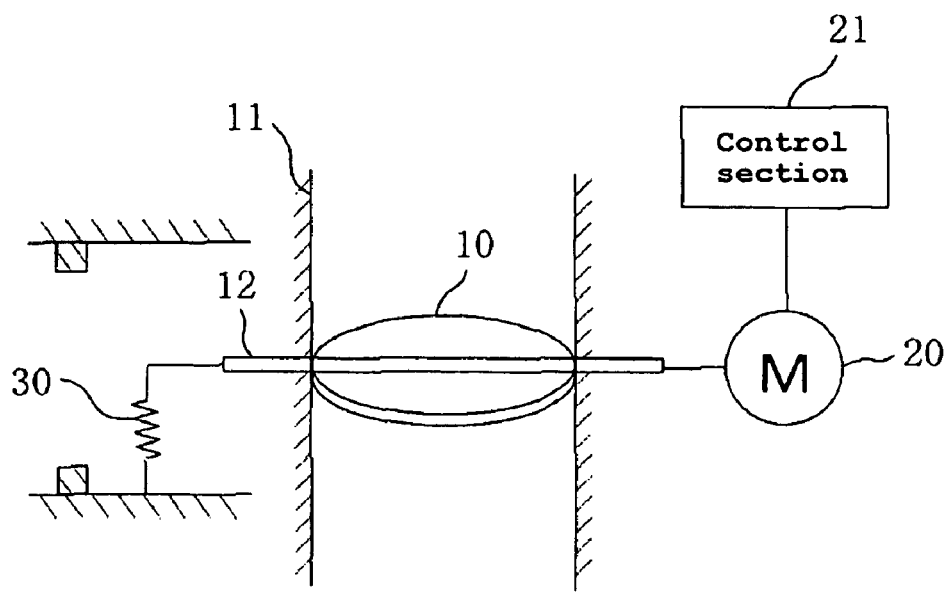
FIG. 1 is a view, illustrating a configuration of an electronic throttle valve control system according to the present invention.

10: throttle valve
11: throttle body
12: valve shaft
20: electric motor
21: control section
22: transmission
30: first urging mechanism
31: second urging mechanism
40: driving gear
41: intermediate large gear
42: intermediate small gear
43: valve shaft driving gear
44: throttle grip
45: throttle cable
46: intermediate pulley
47: transmission member
48: free arm
49: link plate
50: pin
60: case 101: two-wheeled motor vehicle
107: engine unit
110: steering handle bars
122: transmission
127: electric clutch motor
128: shift actuating mechanism
140: throttle mechanism
141: throttle body
142: throttle valve
142a: valve shaft
142b: valve plate
143a: electric motor
143b: driving gear
143c: intermediate large gear
143d: intermediate small gear
143e: valve shaft actuating gear
143f: case
144: throttle valve opening sensor
145: free arm
146: link plate
147: intermediate pulley
148: throttle cable
149: throttle grip
150: throttle grip opening sensor
151: fuel injection valve
152: fuel supply pipe
160: throttle operation mechanism
170: clutch
200: control unit
201: clutch position sensor
205: shift switch
301, 302, 303, 304: input circuit
306, 307: driving circuit
308, 309: output monitoring circuit
310, 311: motor power interrupt circuit
400: relay circuit

BEST MODE FOR CARRYING OUT THE INVENTION

An electronic throttle valve system is advantageous in reducing emission and fuel consumption but has to be equipped with a function which is activated when the electronic throttle valve control system has a failure. However, when a function used for a four-wheeled motor vehicle is applied to a two-wheeled motor vehicle, the rider of the two-wheeled motor vehicle feels a sudden change in the behavior of the vehicle, which the driver of the four-wheeled motor vehicle does not feel, since a two-wheeled motor vehicle is lighter in weight than a four-wheeled motor vehicle.

Such a sudden change in the behavior of the vehicle is caused by rapid rotation of the throttle valve.

To prevent such rapid rotation of the throttle valve, damping means as disclosed in Patent Document 2 should be additionally installed. It is, however, very difficult to provide a space to install such damping means in a two-wheeled motor vehicle.

The present inventor(s) considered that the restriction of the housing space raises an obstacle in applying an electronic throttle valve system to a two-wheeled motor vehicle. As a result of studies about how to provide damping means to an electronic throttle valve control system without increasing a housing space, the present invention has been accomplished.

Description will be hereinafter made of the electronic throttle valve control system of the present invention with reference to FIG. 1 and FIG. 2. The present invention is not limited to the following embodiments.

FIG. 1 is a view, schematically illustrating a basic configuration of an embodiment of the electronic throttle valve control system. A throttle valve 10 for controlling the amount of intake air to an internal combustion engine (not shown) is disposed in a throttle body 11 and has a valve shaft 12 connected to an electric motor 20 for actuating the throttle valve 10. A control section 21 controls the forward and reverse rotation of the electric motor 20, and the throttle valve 10 is therefore opened and closed. The throttle valve 10 has an urging mechanism 30 for urging the throttle valve 10 in the closing direction.

The control section 21 shifts the electric motor 20 to a regenerative mode when the control system has a failure to control the speed at which the throttle valve 10 is rotated in the closing direction by the urging force of the urging mechanism 30. That is, the electric motor in a regenerative mode serves as damping means for preventing rapid rotation of the throttle valve.

Figure 2:
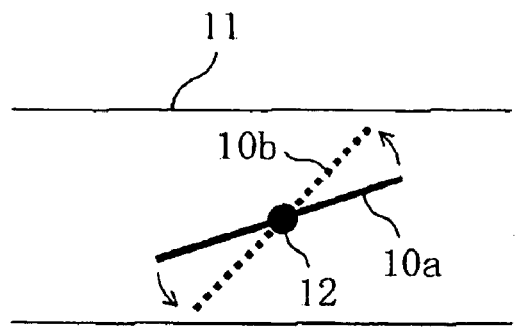
FIG. 2 is a cross-sectional view, illustrating opening positions of the throttle valve in the present invention.

FIG. 2 is a cross-sectional view, illustrating opening positions of the throttle valve 10 in the throttle body 11, viewed in a direction parallel to the valve shaft 12 of the throttle valve 10. In FIG. 2, the solid line represents an opening position 10a of the throttle valve 10 during normal operation. When the control system has a failure, the throttle valve 10 is rotated in the closing direction (the direction indicated by the arrows) by the urging force of the urging mechanism 30 and then held in a predetermined opening position 10b represented by the dotted line.

The urging force of the urging mechanism 30 is adjusted so that the opening of the throttle valve 10 is enough for the internal combustion engine to be maintained in such a state that a failure operation can be conducted at the predetermined opening position 10b shown in FIG. 2. In this state, the vehicle can be at least driven to a place such as a roadside even when the electric control of the electronic throttle valve system is lost. It includes the idle operation state.

Figure 3:
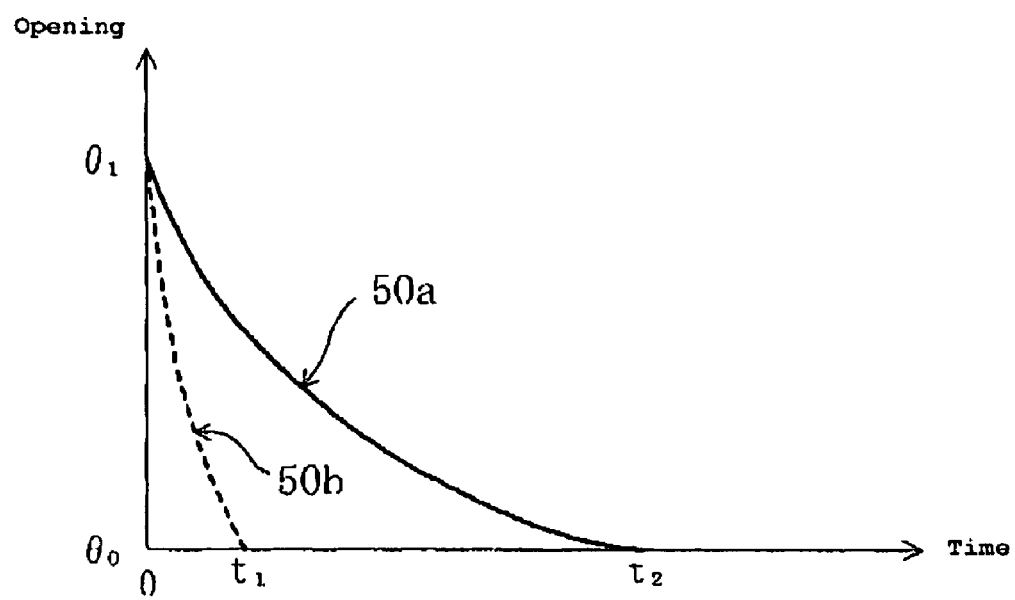
FIG. 3 is a graph, showing the change in the opening of the throttle valve with respect to time in the present invention.

FIG. 3 is a graph, showing the change in the opening of the throttle valve 10 with respect to time during the period when the throttle valve 10 is rotated from a position with an opening $\theta_1$ at the time when the control system has a failure to a position with a predetermined opening $\theta_0$.

The dotted curve 50b represents a conventional case where the throttle valve 10 is rotated in the closing direction only by the urging force of the urging mechanism 30.

The opening of the throttle valve 10 reaches the predetermined opening $\theta_0$ within a very short period of time ($t_1$). The solid curve 50a represents a case where the electric motor 20 is shifted to a regenerative mode to rotate the throttle valve 10 in the closing direction at a reduced speed.

The opening of the throttle valve 10 takes a long time ($t_2$) to reach the predetermined opening $\theta_0$.

According to the electronic throttle valve control system of the present invention, the throttle valve is not rotated rapidly even when the control system has a failure. As a result, the rider of the two-wheeled motor vehicle does not feel a sudden change in the behavior of the vehicle.

Although the throttle valve is rotated in the closing direction and held in a predetermined opening position when the control system has a failure in this embodiment, the throttle valve may be rotated to the fully closed position when the internal combustion engine can be maintained by other means in such a state that a failure operation can be conducted. For example, when a bypass line is separately provided in the throttle body so that a certain amount of air can be introduced into the internal combustion engine through the bypass line when the control system has a failure, the internal combustion engine can be maintained in such a state that a failure operation can be conducted. In the case of a two-wheeled motor vehicle, there is no need to provide such a bypass line when it is so light that the rider can walk with it even when the throttle valve is fully closed.

The control circuit for shifting the electric motor 20 to a regenerative state when the control system has a failure will be described with reference to FIG. 4(a) to FIG. 4(c).

As shown in FIG. 4(a) to FIG. 4(c), the control circuit is constituted of an H-bridge circuit having four transistors FET1 to FET4. FIG. 4(a) illustrates the control circuit at the time when the electric motor 20 is rotating in the forward direction.

When the transistors FET1 and FET4 are turned on and the transistors FET2 and FET3 are turned off, a current flows as indicated by the arrow. FIG. 4(b) illustrates the control circuit at the time when the electric motor 20 is rotating in the reverse direction.

When the transistors FET2 and FET3 are turned on and the transistors FET1 and FET4 are turned off, a current flows as indicated by the arrow. By changing the direction in which the current flows through the electric motor 20, the rotating direction of the electric motor 20 is changed and the throttle valve 10 is controlled to open or close.

FIG. 4(c) illustrates the control circuit at the time when the electric motor 20 is in a regenerative mode.

When the transistors FET1 and FET2 are turned on and the transistors FET3 and FET4 are turned off, a current flows as indicated by the arrow. At this time, the electric motor 20 serves as an electric generator.

Then, a counter-electromotive force is generated and a current in the opposite direction is produced. By the current, a torque in a direction opposite to the rotating direction of the electric motor 20 is generated and serves as a brake for reducing the rotation of the electric motor 20. The electric motor 20 can be shifted to the regenerative mode by turning off the transistors FET1 and FET2 and turning on the transistors FET3 and FET4. When the electric motor 20 is shifted to a regenerative mode, the power supply connected to the electric motor is preferably shut off.

The function in the present invention is activated by shifting the electric motor 20 to a regenerative mode, and this operation can be controlled using the control circuit for controlling the normal operation of the electric motor 20. That is, since the function in the present invention can be accomplished using the electric motor 20 for actuating the throttle valve 10 as a damping means for preventing rapid rotation of the throttle valve, and the control circuit for controlling the forward and reverse rotation of the electric motor 20 as means for controlling the damping means, there is no need to provide any additional mechanism to a conventional electronic throttle valve control system.

As described above, according to the electronic throttle valve control system of the present invention, there is no need for an additional housing space and rapid rotation of the throttle valve can be prevented by a simple control when the electronic throttle valve control system has a failure. As a result, the rider on the two-wheeled motor vehicle does not feel a sudden change in the behavior of the vehicle.

Especially in the case of a two-wheeled motor vehicle, throttle valves are provided for each cylinder and located in the vicinity of the combustion chambers, rapid rotation of the throttle valves results in a rapid decrease in the output of the internal combustion engine and the rider feels it as a sudden change in the behavior of the vehicle.

The present invention is therefore useful for application to a two-wheeled motor vehicle.

Figure 5:
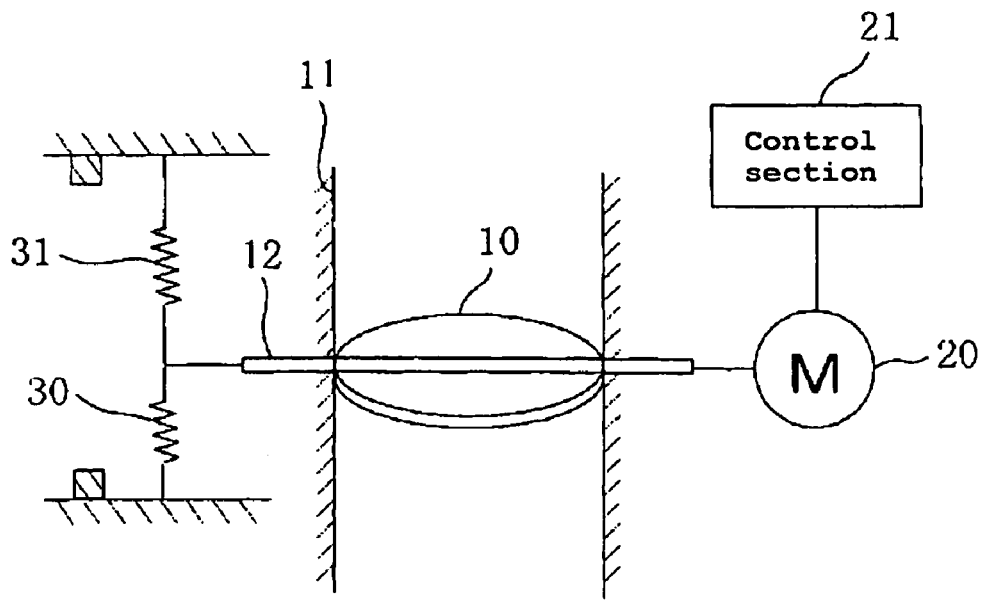
FIG. 5 is a view, illustrating another configuration of the electronic throttle valve control system according to the present invention.

FIG. 5 is a view, schematically illustrating a basic configuration of another embodiment of the electronic throttle valve control system of the present invention. This embodiment is different from the embodiment shown in FIG. 1 in having two urging mechanisms. That is, the throttle valve 10 has a first urging mechanism 30 for urging the throttle valve 10 in the closing direction and a second urging mechanism 31 for urging the throttle valve 10 in the opening direction. When the control system has a failure, the control section 21 shifts the electric motor 20 to a regenerative mode to control the speed at which the throttle valve 10 is rotated in the closing direction by the relative urging force of the first and second urging mechanisms 30 and 31.

Figure 6:
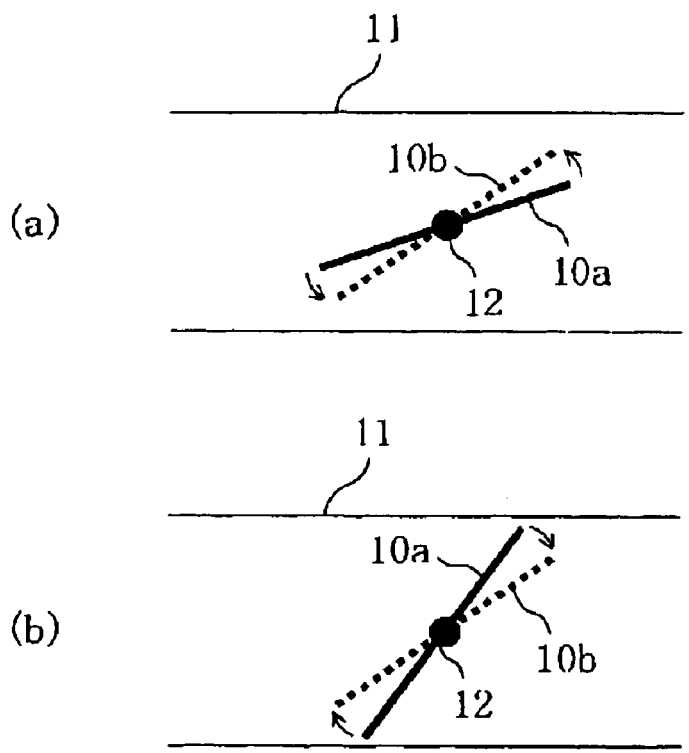
FIG. 6(a) and FIG. 6(b) are cross-sectional views, illustrating opening positions of the throttle valve in the present invention.

FIG. 6(a) and FIG. 6(b) are a cross-sectional views, illustrating opening positions of the throttle valve 10 in the throttle body 11, as seen in a direction parallel to the valve shaft 12 of the throttle valve 10. In FIG. 6(a), the solid line represents an opening position 10a of the throttle valve 10 during normal operation. When the control system has a failure, the throttle valve 10 is rotated in the closing direction (the direction indicated by the arrows) by the relative urging force of the first and second urging mechanisms 30 and 31 and then held in a predetermined opening position 10b represented by the dotted line.

The predetermined opening position 10b represented by the dotted line is uniquely determined depending on the relative urging force of the urging mechanisms 30 and 31. The opening of the throttle valve 10 is adjusted to be large enough that the internal combustion engine is maintained in such a state that a failure operation can be conducted at the predetermined opening position 10b. When the throttle valve 10 has only one urging mechanism, the predetermined opening position 10b is the point where the urging force urging the throttle valve 10 in the opening direction and the frictional force exerted on the valve shaft 12 of the throttle valve 10 are balanced. Thus, it is difficult to control the frictional force independently and it is therefore difficult to control the predetermined opening position 10b precisely.

When the throttle valve 10 has two urging mechanisms, since the predetermined opening position 10b is uniquely determined at the point where the urging force urging the throttle valve 10 in the closing direction and the urging force urging the throttle valve 10 in the opening direction are balanced, the predetermined opening position 10b can be precisely controlled.

Thus, in a case where the throttle valve 10 has two urging mechanisms, if the throttle valve 10 is in an opening position 10b close to the fully closed position as shown in FIG. 6(b) when the control system has a failure, the throttle valve 10 is rotated in the opening direction (the direction indicated by the arrows) and then held in a predetermined opening position 10b represented by the dotted line. The opening of the throttle valve 10 can be reliably large enough that the internal combustion engine is maintained in such a state that a failure operation can be conducted.

Figure 7:
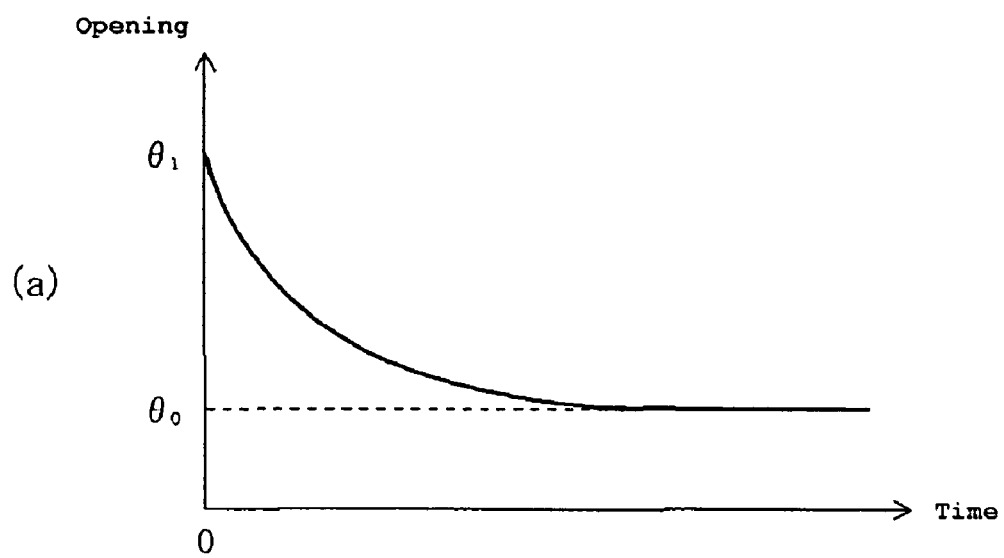
FIG. 7(a) and FIG. 7(b) are graphs, showing the change in the opening of the throttle valve with respect to time in the present invention.
Figure 7:
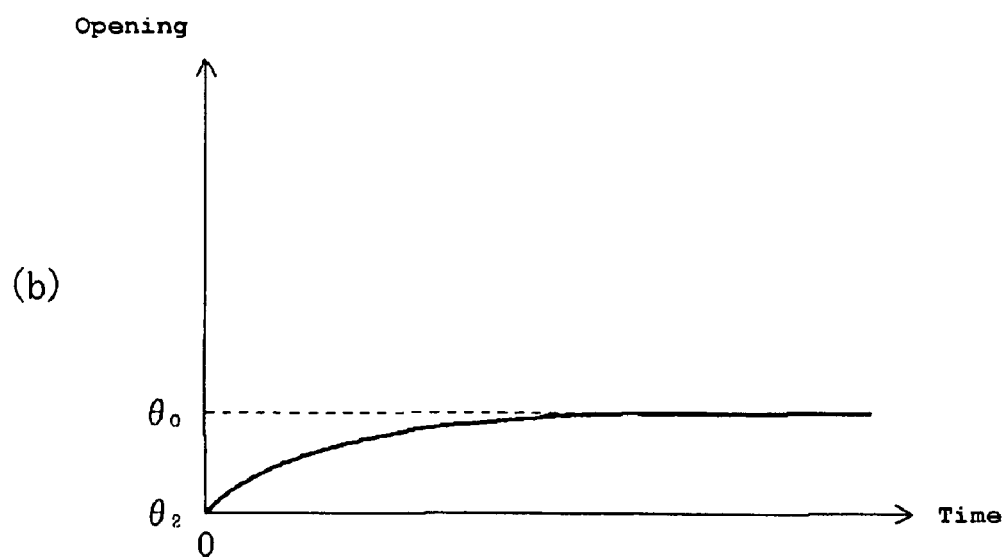

FIG. 7(a) and FIG. 7(b) are graphs showing the change in the opening of the throttle valve 10 with respect to time during the period when the throttle valve 10 is rotated from a position with an opening $\theta_1$ at the time when the control system has a failure to a position with a predetermined opening $\theta_0$. FIG. 7(a) shows the case in which the opening $\theta_1$ at the time when the control system has a failure is greater than the predetermined opening $\theta_0$.

The throttle valve 10 is slowly rotated in the closing direction to the position with the predetermined opening $\theta_0$. FIG.

7(b) shows a case in which the opening $\theta_2$ at the time when the control system has a failure is, smaller than the predetermined opening $\theta_0$.

The throttle valve 10 is slowly rotated to the opening direction to the position with the predetermined opening $\theta_0$.

The feature of the electronic throttle valve control system according to the present invention is that the electric motor is shifted to a regenerative mode when the control system has a failure. To shift the electric motor to a regenerative mode has a technical meaning of preventing rapid rotation of the throttle valve. That is, the throttle valve is held in the opening position at the time when the control system has a failure without the urging mechanism for urging the throttle valve in the closing direction.

Figure 8:
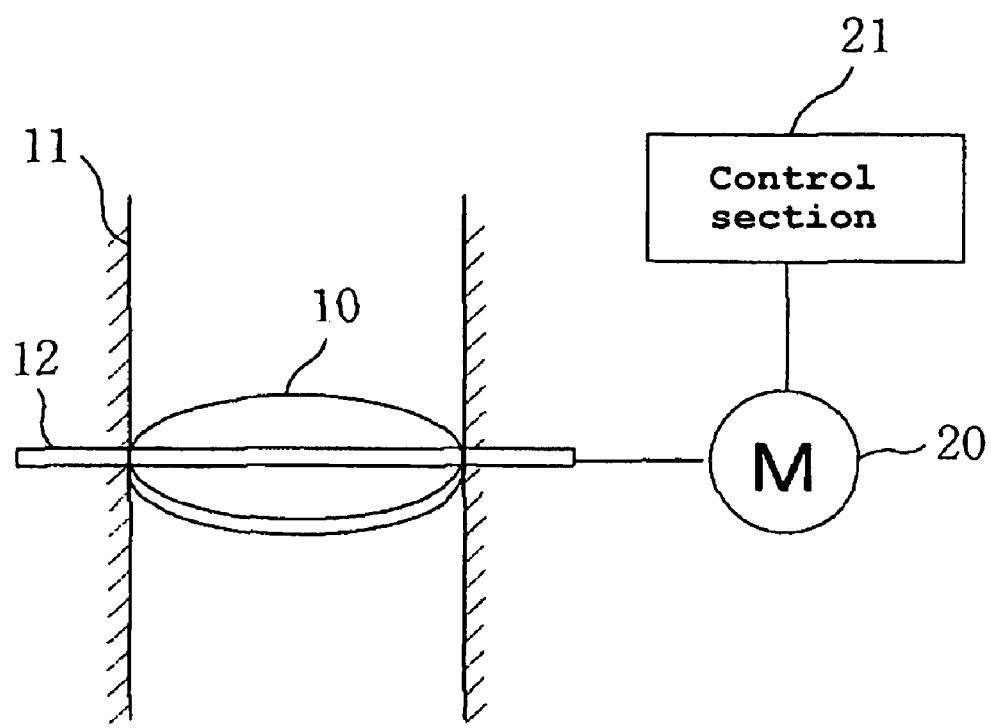
FIG. 8 is a view, illustrating another configuration of the electronic throttle valve control system according to the present invention.

FIG. 8 is a view, schematically illustrating the configuration of an embodiment of the electronic valve control system made from the above viewpoint. That is, the urging mechanisms 30 and 31 are omitted from the embodiment shown in FIG. 1 to FIG. 5. In this case, when the control system has a failure, the throttle valve 10 is held in the opening position at that time. Thus, the rider of the two-wheeled motor vehicle can prevent a sudden change in the behavior of the vehicle and does not feel discomfort and a change in the operability even when the electronic throttle valve control system has a failure.

When the electronic throttle valve control system has a failure, the throttle valve can be rotated from the opening position at the time when the control system has a failure in the closing direction to a position at which a failure operation can be conducted with a throttle operation mechanism with which the throttle valve 10 can be actuated manually.

Figure 9:
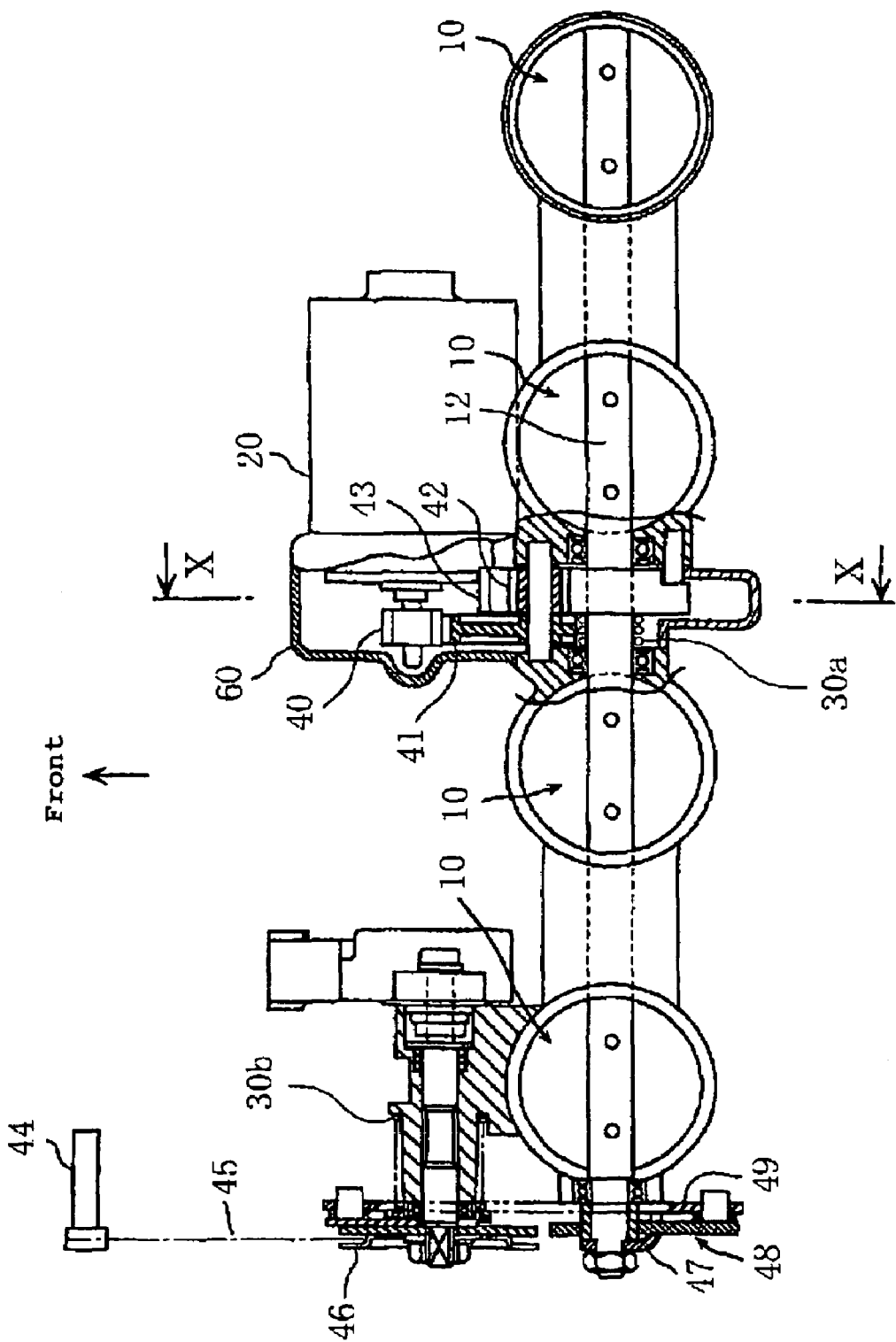
FIG. 9 is a view, illustrating a configuration of a throttle valve and an electronic motor in the present invention.
Figure 10:
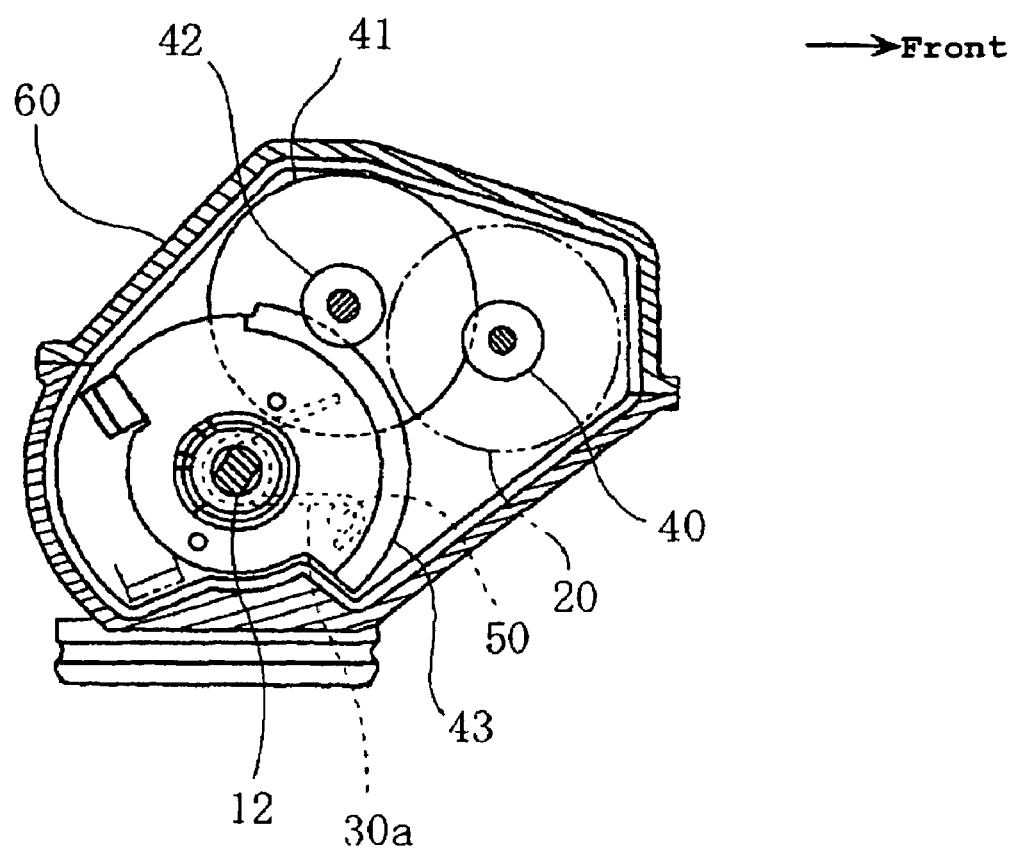
FIG. 10 is a cross-sectional view, taken along the line X-X in FIG. 9.

Referring to FIG. 9 and FIG. 10, an example of the configuration in which the throttle valve is provided with an urging mechanism will be described.

FIG. 9 is a view, illustrating a configuration of the throttle valve 10 and the electric motor 20 for actuating the throttle valve 10. Each throttle body 11 has a cylindrical shape, and each throttle valve 10 is fixed to a common valve shaft 12, extending through all the throttle bodies 11. The electric motor 20 is positioned with its rotating shaft parallel to the valve shaft 12.

The rotation of a driving gear 40 attached to the rotating shaft of the electric motor 20 is transmitted to a valve shaft driving gear 43 that is fixed to the valve shaft 12 via an intermediate large gear 41 and an intermediate small gear 42, and the valve shaft 12 is driven to rotate by the valve shaft driving gear 43.

FIG. 10 is a cross-sectional view, taken along the line X-X in FIG. 9. A spring 30a is attached so as to surround the valve shaft 12. One end of the spring 30a is engaged with a pin 50 provided on the valve shaft actuating gear 43, and the other end of the spring 30a is supported by a case 60 or one of the throttle bodies 11 (not shown). The spring 30a urges the valve shaft 12 in the closing direction via the valve shaft driving gear 43.

Since the spring 30a constituted as described above can be incorporated in a reduction gearing for transmitting the rotation of the electric motor 20 to the valve shaft of the throttle valve, there is no need for an additional housing space to install the spring 30a. The spring 30a as the urging mechanism can serve as a return spring of the reduction gearing for preventing backlash thereof. Thus, only one spring can serve as means for exerting an urging force and means for preventing backlash.

The throttle operation mechanism with which the throttle valve 10 can be actuated manually when the control system has a failure can be provided with an urging mechanism.

The throttle operation mechanism is shown in the left hand side of FIG. 9. A throttle grip 44 attached to a steering handle bar (not shown) is connected via a throttle cable 45 to an intermediate pulley 46, which is connected to a free arm 48 via a link plate 49.

Figure 11:
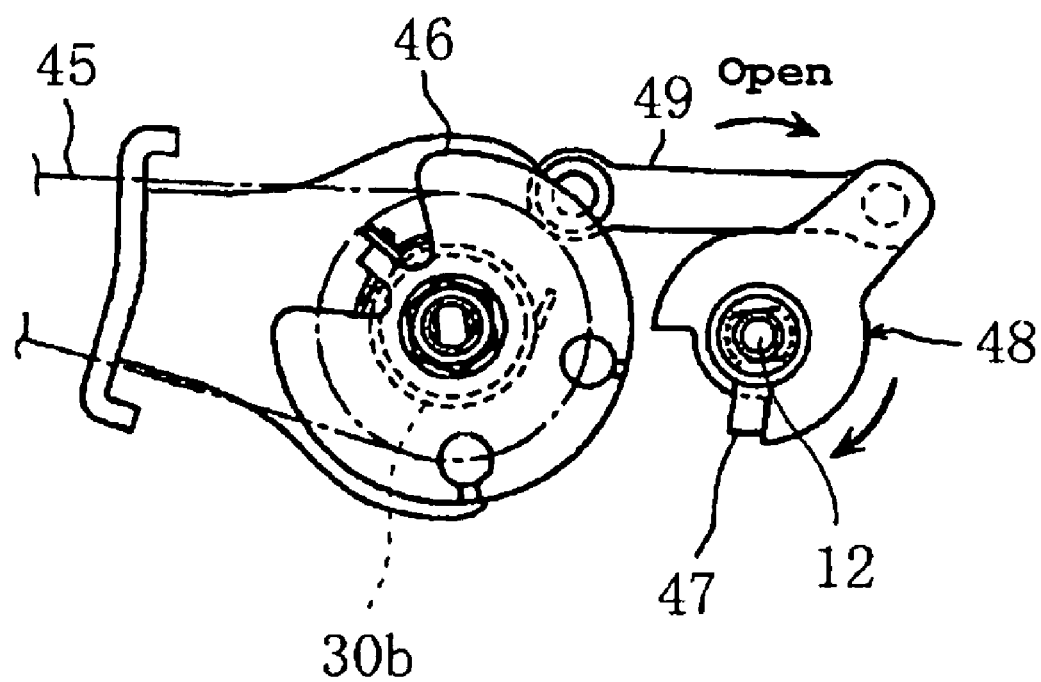
FIG. 11 is a cross-sectional view, of a throttle operation mechanism in the present invention.

FIG. 11 is a cross-sectional view of the throttle operation mechanism. The rotational operation of the throttle grip 44 is transmitted to the intermediate pulley 46 via the throttle cable 45, and the rotation of the intermediate pulley 46 is transmitted to the free arm 48 via the link plate 49. The free arm 48 has a notch, and, when the free arm 48 is rotated in the direction indicated by the arrow, a side edge of the notch presses a transmission member 47 to rotate the valve shaft 12. The throttle valve 10 can be thereby rotated manually.

As shown in FIG. 11, a spring 30b is attached so as to surround the rotating shaft of the intermediate pulley 46.

One end of the spring 30b is engaged with a pin provided on the intermediate pulley 46, and the other end is supported by one of the throttle bodies 11. The spring 30b urges the valve shaft 12 in the closing direction via the transmission member 47.

The electronic throttle valve control system according to the present invention has been described. The control system of the present invention characterized by using a regenerative state of an electric motor is applicable to another mechanism having an electric motor as a power source.

A control system for a throttle valve or a clutch driven by an electric motor will be described in detail with reference to FIG. 12 to FIG. 19.

Figure 12:
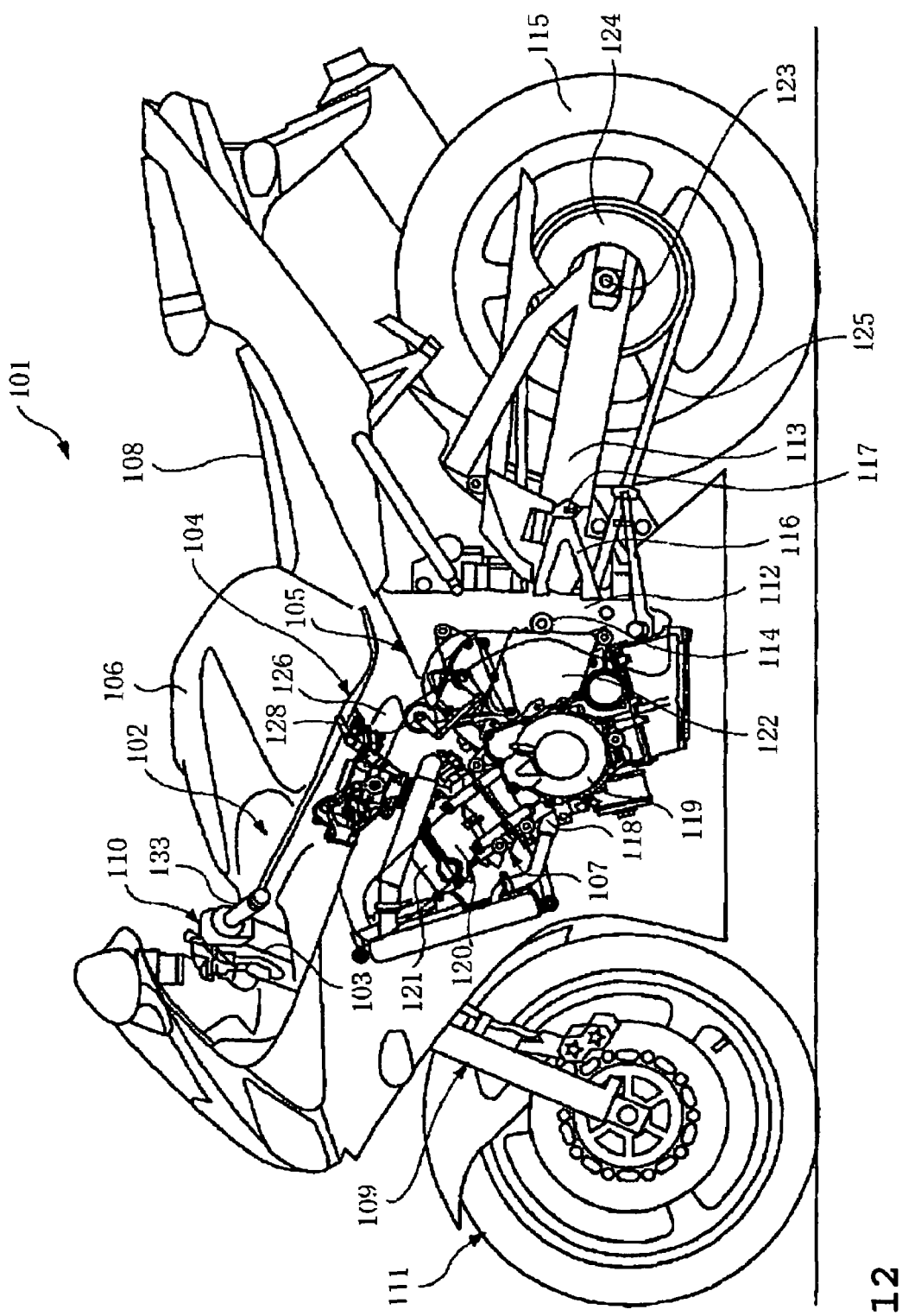
FIG. 12 is a left side view of a two-wheeled motor vehicle in the present invention.

FIG. 12 shows a configuration of a two-wheeled motorcycle. A two-wheeled motorcycle 101 has a body frame 102 having a head pipe 103, a pair of right and left tank rails 104 connected to the head pipe 103, and a rear frame 105 extending obliquely backward from the rear ends of the tank rails 104. A fuel tank 106 is disposed on the tank rails 104 and an engine unit 107 is located below the tank rails 104. A main seat 108 is disposed on a front portion of the rear frame 105.

A front fork 109 is pivotally supported by the head pipe 103. Steering handle bars 110 are attached to the upper end of the front fork 109, and a front wheel 111 is supported at the lower end of the front fork 109. Rear arms 113 are supported by rear arm brackets 112 at lower rear ends of the tank rails 104 via a pivotal shaft 114 for vertical swinging movement, and a rear wheel 115 is arranged at the rear ends of the rear arms 113.

Step brackets 116 extend backward from the rear arm brackets 112, and steps 117 for supporting the feet of the rider extend outward in the width direction of the vehicle from the step brackets 116.

The engine unit 107, which is a water-cooled, four-cycle, parallel four-cylinder engine which serves as a power source and which has a cylinder block 118 positioned with its cylinder axis slightly inclined forward and a crankcase 119 located under the cylinder block 118 and extending in the width direction of the vehicle for housing a crankshaft, is suspended from and supported by the body frame 102. A cylinder head 120 and a head cover 121 are mounted on an upper surface of the cylinder block 118.

A transmission case (which will be hereinafter referred to as "transmission") 122 for housing a multi-speed shift mechanism constituted of a multi-speed gearbox having a main shaft and a drive shaft extending parallel to the crankshaft is integrally formed at the rear of the cylinder block 118. The transmission 122 (transmission section) has a clutch (controlled section) for connecting and disconnecting the transmission of rotation when the gearbox is shifted. The crankcase 119 is attached to lower sides of the cylinder block 118 and the transmission 122.

A driven sprocket 124 is attached to a shaft 123 by which the rear wheel is rotatably supported at the rear ends of the rear arms 113. A chain 125 is entrained around the driven sprocket 124 and a driving sprocket (not shown) secured to the drive shaft of the engine unit 107 and the engine power is therefore transmitted to the rear wheel 115 via the chain 125.

An AMT (automated transmission) mechanism 126 is located behind the cylinder block 118 and on the transmission 122. The AMT mechanism 126 automatically operates the clutch and shifts the gearbox of the transmission 122, and includes an electric clutch motor 127 for operating the clutch and other component parts necessary for AMT.

Figure 13:
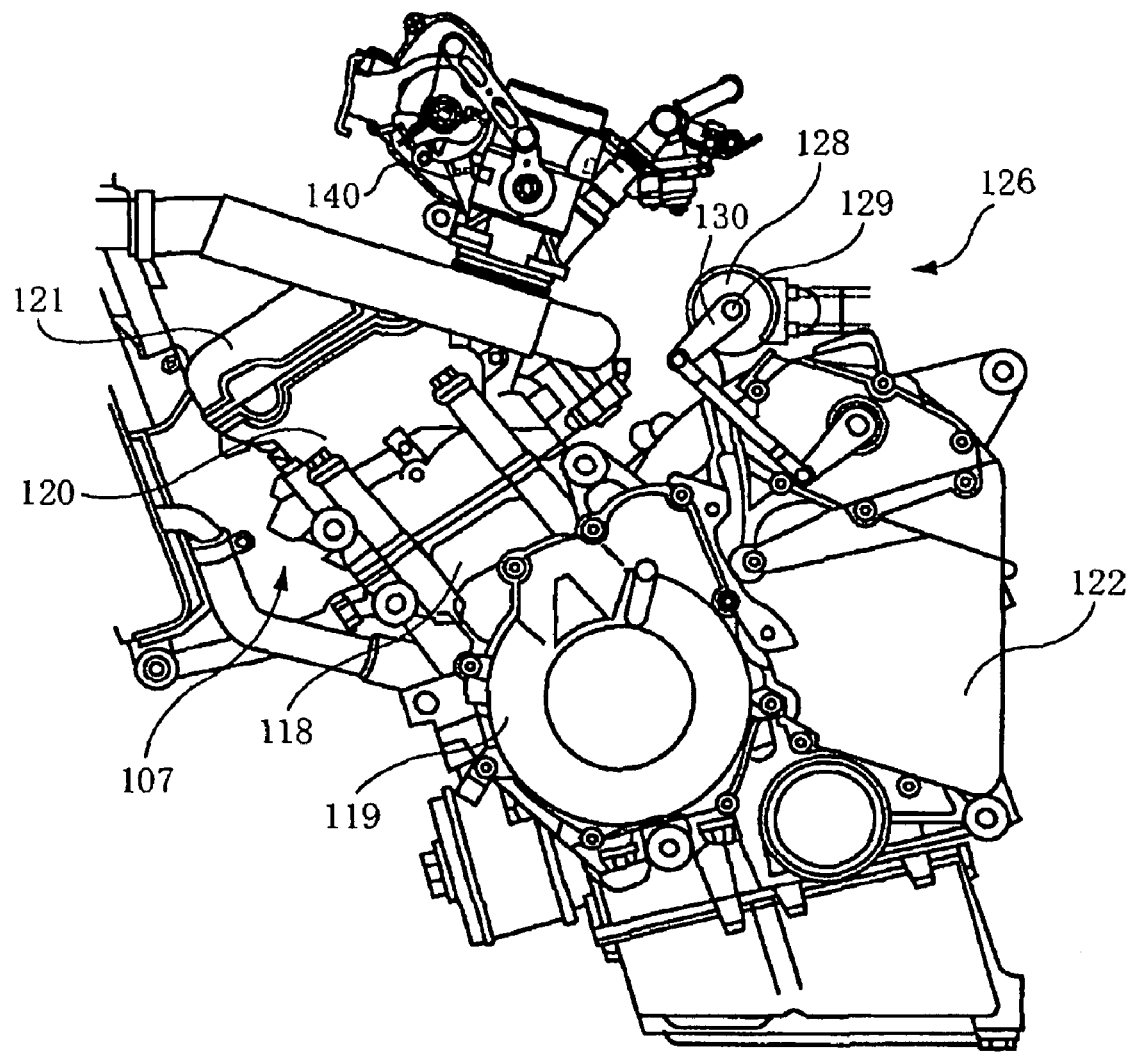
FIG. 13 is an enlarged left side view of an engine unit in the present invention.

FIG. 13 shows a shift actuating mechanism 128. The shift actuating mechanism 128 is located on the left side of the two-wheeled motor vehicle 101 and on the transmission 122, and has a link mechanism constituted of a rod 129 and a lever 130 for operating the multi-speed shift mechanism in the transmission 122.

Figure 14:
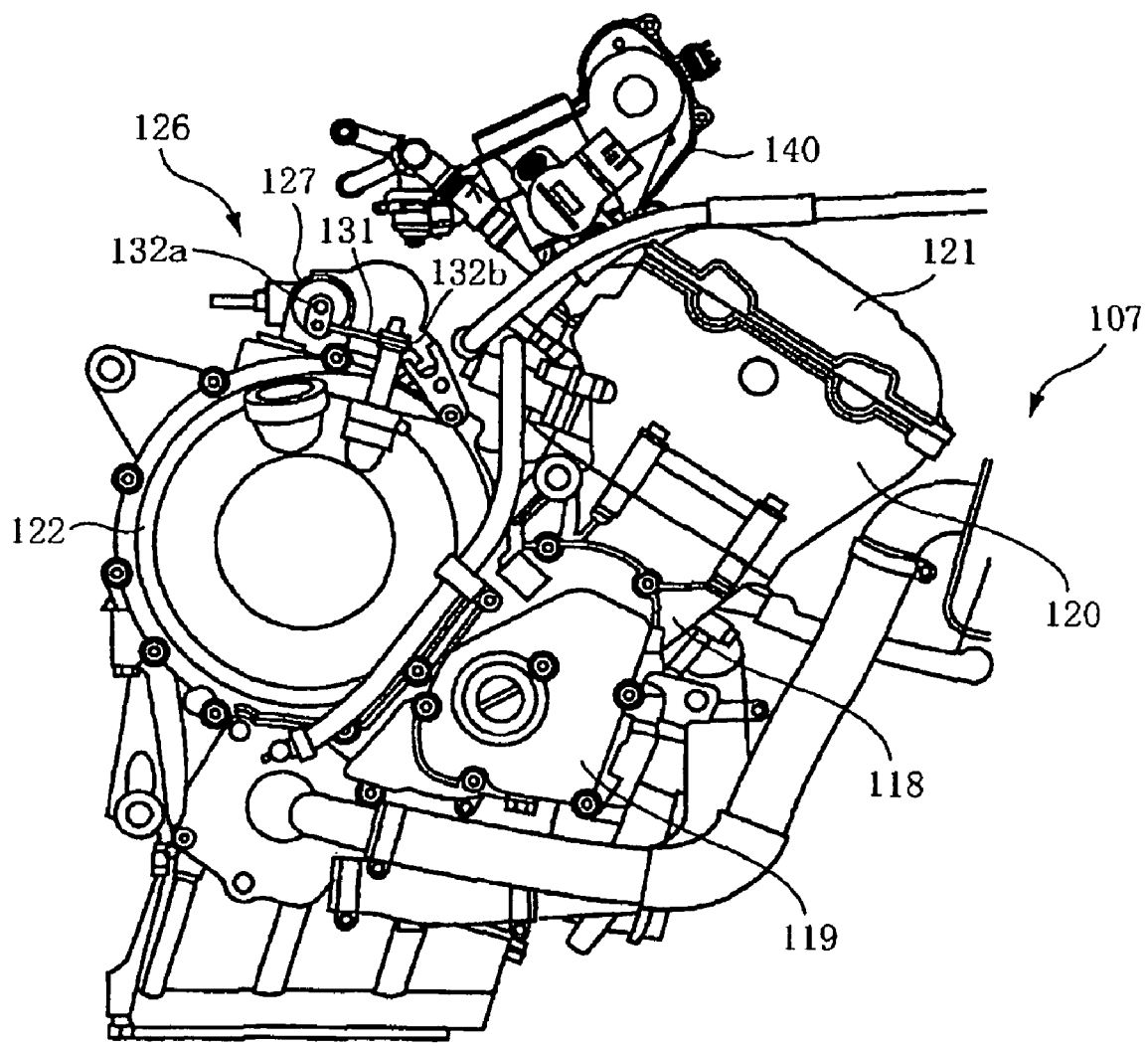
FIG. 14 is an enlarged right side view of the engine unit in the present invention.

FIG. 14 shows an electric clutch motor 127. The electric clutch motor 127 is located on the right side of the two-wheeled motor vehicle 101 and on the transmission 122.

A clutch mechanism is constituted of the electric clutch motor 127, a rod 131, and levers 132a and 132b. When the electric clutch motor 127 is driven, the lever 132a is oscillated in the vertical direction in the drawing, and, by the oscillating behavior of the lever 132a, the rod 131 is moved in the lateral direction in the drawing.

Then, by the movement of the rod 131, the lever 132b is oscillated in the longitudinal direction in the drawing to engage or disengage the clutch in the transmission 122. The electric clutch motor 127, the rod 131, and the levers 132a and 132b function as driving sources.

A shift switch (not shown), for example, is provided on the grip side on a left handle bar 133 shown in FIG. 12 so that the rider can manually shift up or down the gearbox from neutral to top gear and vice versa. An AMT switch (not shown) is also provided on the grip side on the left handle bar 133 so that the rider can switch the mode of the gear shift operation between semi-automatic and full-automatic modes.

The shifting of the multi-speed shift mechanism and the clutch is conducted using the AMT mechanism 126 through a cable or a hydraulic mechanism (not shown).

Figure 15:
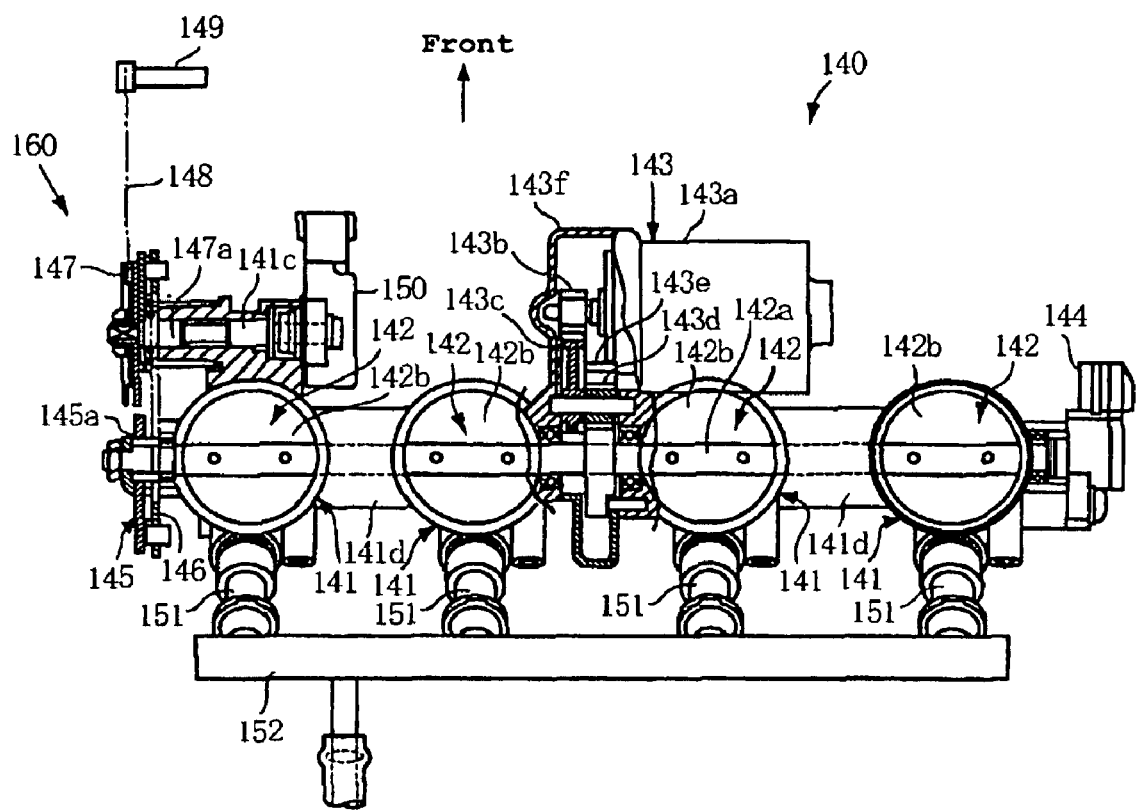
FIG. 15 is a view, illustrating the configuration of a throttle valve mechanism in the present invention.

FIG. 15 illustrates a throttle mechanism 140 that is connected to intake ports of cylinders in the engine unit 107.

Each throttle body 141 has a cylindrical shape, and each throttle valve 142 has a disk-like valve plate 142b disposed in the corresponding throttle body 141 and fixed to a common valve shaft 142a extending through all the throttle bodies 141. The right two throttle bodies 141 and the left two throttle bodies 141 in FIG. 15 are connected to each other by a connecting boss 141d, and an electric driving mechanism 143 is disposed between the center two throttle bodies 141.

The electric driving mechanism 143 has an electric motor 143a positioned with its rotating shaft parallel to the valve shaft 142a. The rotation of a driving gear 143b attached to the rotating shaft of the electric motor 143a is transmitted to a sector-shaped valve shaft driving gear 143e fixed to the valve shaft 142a via an intermediate large gear 143c and an intermediate small gear 143d. The valve shaft 142a is driven to rotate by the valve shaft driving gear 143e. The electric driving mechanism 143 is housed in a case. 143f formed separately from the throttle bodies 141.

A throttle valve opening sensor 144 for detecting the opening of the throttle valves 142 is attached to the right end of the valve shaft 142a extending outward. A disk-shaped boss 145a of a free arm 145 is attached to the left end of the valve shaft 42a for relative rotation.

The free arm 145 has an arm portion 145b (not shown) connected to an intermediate pulley 147 via a link plate 146. The intermediate pulley 147 is connected to a throttle grip 149 on a steering handle bar 110 via a throttle cable 148.

The link plate 146, the intermediate pulley 147, the throttle cable 148 and the throttle grip 149 constitute a throttle operation mechanism 160 which opens and closes the throttle valves 142 manually in accordance with the degree to which the throttle grip 149 is operated by the rider. The electric driving mechanism 143 and the throttle operation mechanism 160 function as driving sources.

The intermediate pulley 147 is fixedly supported by the left end of an intermediate shaft 147a for rotation together therewith, and the intermediate shaft 147a is rotatably supported by a boss 141c formed on the leftmost throttle body 141. A throttle grip opening sensor 150 for detecting the angle through which the throttle grip 149 is operated is attached to the right end of the intermediate shaft 147a.

Fuel injection valves 151 for each cylinder are disposed under the throttle bodies 141, and a common fuel supply pipe 152 is connected to fuel introduction sections of the fuel injection valves 151.

Figure 16:
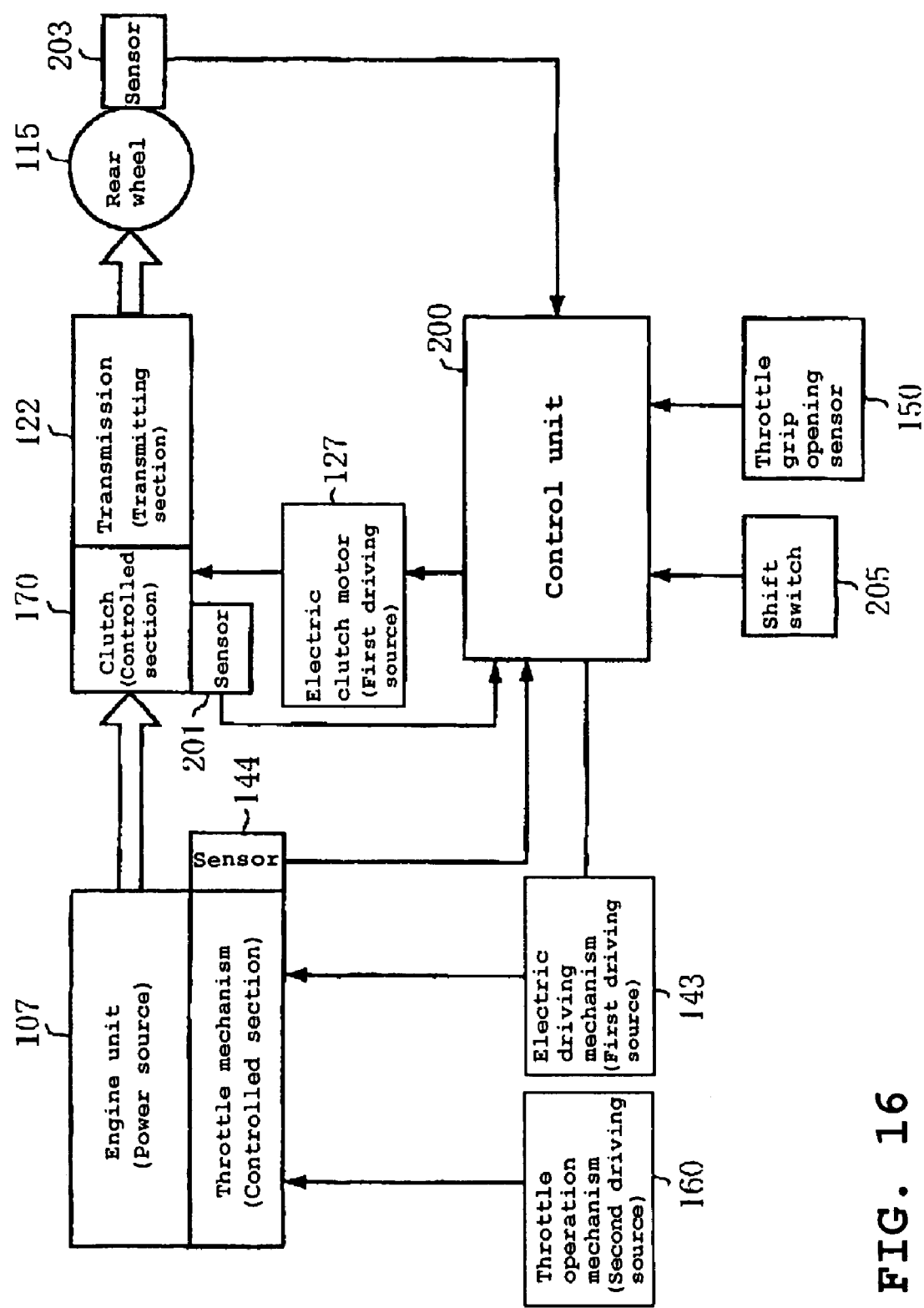
FIG. 16 is a view, illustrating the configuration of a control system of a two-wheeled motor vehicle in the present invention.

FIG. 16 is a block diagram, illustrating the configuration of a control system of the two-wheeled motor vehicle 101.

In an engine unit 107, the throttle mechanism 140 controls the amount of intake air to the cylinders and the fuel injection valves 151 adjust the amount of fuel to be injected into the cylinders to control the output power. In the throttle mechanism 140, the valve shaft 142a is rotated by the driving force of the electric motor 143a in the electric driving mechanism 143 and the throttle valves 142 are opened and closed. The throttle valve opening sensor 144 detects the opening of the throttle valves 142 and outputs a throttle opening detection signal to a control unit 200.

The electric motor 143a in the electric driving mechanism 143 generates a driving force for rotating the valve shaft 142a in the throttle mechanism 140 via the driving gear 143b, the intermediate large gear 143c and the intermediate small gear 143d according to a throttle driving signal inputted from the control unit 200. The throttle operation mechanism 160 manually opens or closes the throttle valves 142 in accordance with the degree to which the throttle grip 149 is operated by the rider when the driving force from the electric driving mechanism 143 is cut off.

The clutch 170 is switched by the driving force of the electric clutch motor 127 to connect or disconnect power transfer from the engine unit 107 to the transmission 122. The clutch 170 has a clutch spring, a clutch plate and a friction plate (which are not shown).

To connect the clutch 170, the driving force of the electric clutch motor 127 is so controlled that the clutch plate and friction plate are pressed gradually in the direction to be coupled to the drive shaft (not shown) by the pressing force of the clutch spring so that power can be gradually transmitted from the engine unit 107 to the transmission 122. To disconnect the clutch 170, the pressing force of the clutch spring is released by the driving force of the electric clutch motor 127 to move the clutch plate and friction plate in the direction away from the drive shaft so that the transmission of power from the engine unit 107 to the transmission 122 can be cut off.

The driving force of the electric clutch motor 127 is controlled by a clutch switch signal inputted from a control unit 200, and the connection and disconnection of the clutch 170 is controlled by the driving force. A clutch sensor 201 detects the operating condition of the clutch 170 and outputs a clutch position detection signal to the control unit 200. The clutch spring and the electric clutch motor 127 function as driving sources.

A vehicle speed sensor 203 detects the rotational speed of a rear wheel 115 and outputs a vehicle speed signal corresponding to the rotational speed to the control unit 200. The throttle grip opening sensor 150 detects the angle through which the throttle grip 149 is operated and outputs a throttle operation angle detection signal to the control unit 200. A shift switch 205 out puts a shift position signal to the control unit 200 in response to the manual operation of the rider.

Figure 17:
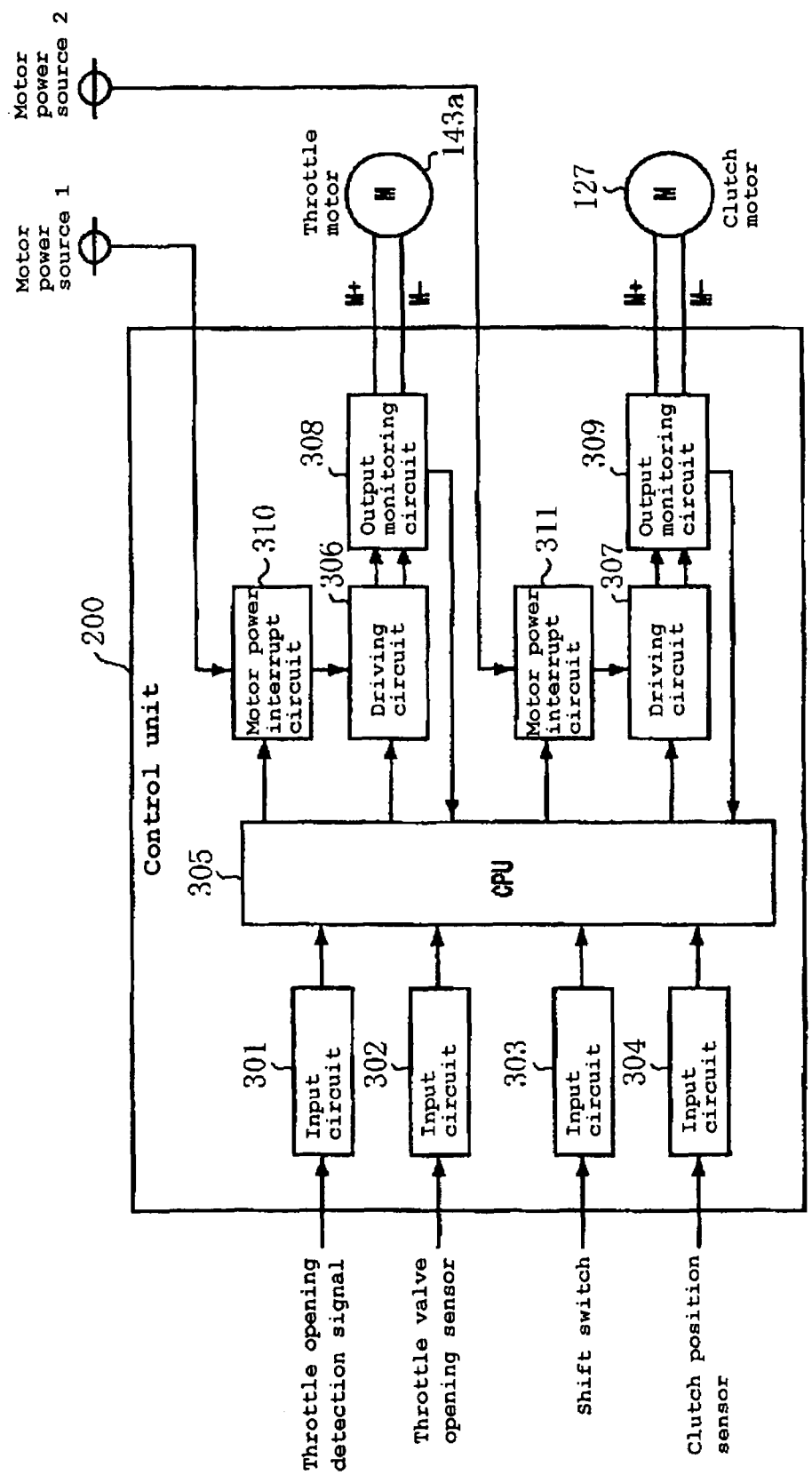
FIG. 17 is a view, illustrating the configuration of a control unit in the present invention.

FIG. 17 is a block diagram of the control unit 200. The control unit 200 is constituted of a plurality of input circuits 301 to 304, a CPU 305, a plurality of driving circuits 306 and 307, a plurality of output monitoring circuits 308 and 309, and a plurality of motor power interrupt circuits 310 and 311.

The input circuit 301 outputs to the CPU 305 a throttle opening detection signal inputted from the throttle valve opening sensor 144. The input circuit 302 outputs to the CPU 305 a throttle operation angle detection signal inputted from the throttle grip opening sensor 150. The input circuit 303 outputs to the CPU 305 a shift position signal inputted from the shift switch 205. The input circuit 304 outputs to the CPU 305 a clutch position detection signal inputted from the clutch position sensor 201.

The CPU 305 outputs control signals for controlling the operation of the electric motor 143a in the electric driving mechanism 143 and the electric clutch motor 127 to the driving circuits 306 and 307, respectively, based on the signals inputted from the input circuits 301 to 304.

The CPU 305 has a function of monitoring the operating condition of itself and detecting its abnormal operation. When detecting abnormal operation, the CPU 305 outputs interrupt signals to the motor power interrupt circuits 310 and 311 and outputs to the driving circuits 306 and 307 mode switching signals for shifting the electric motors 127 and 143a into brake mode.

The CPU 305 also has a function of detecting an abnormality of the sensors 144, 150 and 201 and the switch 205 based on the signals inputted from the input circuits 301 to 304. When detecting an abnormality of any of them, the CPU 305 outputs abnormality signals to the motor power interrupt circuits 310 and 311 and outputs to the driving circuits 306 and 307 mode switching signals for shifting the electric motors 127 and 143a to a brake mode.

The CPU 305 also has a function of detecting an abnormality of the driving circuits 306 and 307 and the electric motors 143a and 127 based on the signals inputted from the output monitoring circuits 308 and 309.

When detecting an abnormality of any of them, the CPU 305 outputs mode switching signals to the driving circuits 306 and 307.

Figure 4:
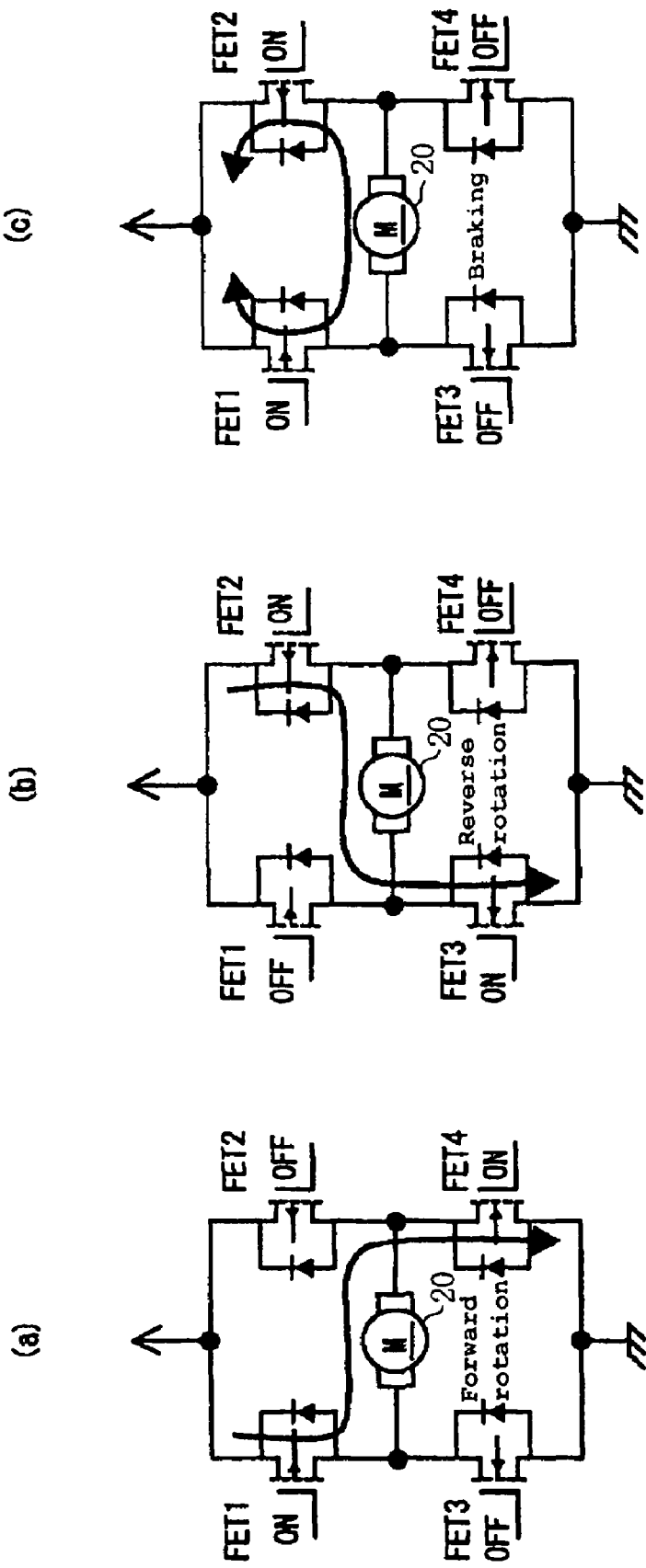
FIG. 4(a) shows the state of a control circuit during forward rotation of the electric motor.
FIG. 4(b) shows the state of the control circuit during reverse rotation of, and FIG. 4(c) shows the state of the control circuit during a regenerative mode of the electronic motor.

Each of the driving circuits 306 and 307 is an H-bridge circuit having four transistors FET1 to FET4 (see FIG. 4). When the driving circuits 306 and 307 and the electric motors are in the forward rotation mode, the transistors FET1 and FET4 are on and the transistors FET2 and FET3 are off, and a current flows as shown in FIG. 4(*a*). When the driving circuits 306 and 307 and the electric motors are in the reverse rotation mode, the transistors FET2 and FET3 are on and the transistors FET1 and FET4 are off, and a current flows as shown in FIG. 4(*b*).

When the driving circuits 306 and 307 and the electric motors are in the brake mode, the transistors FET1 and FET2 are on and the transistors FET3 and FET4 are off, and a current flows as shown in FIG. 4(*c*). At this time, the electric motors 127 and 143a serve as electric generators.

Then, a counter-electromotive force is generated and a current in the opposite direction is produced. By the current, a torque in a direction opposite to the rotating direction of the electric motors 127 and 143a is generated and serves as a brake.

The driving circuits 306 and 307 control the on and off of the transistors FET1 to FET4 based on a control signal inputted from the CPU 305 to control the forward and reverse rotation of the electric motors 127 and 143a, respectively. The driving circuits 306 and 307 control the on and off of the transistors FET1 to FET4 based on a mode switching signal inputted from the CPU 305 to control the braking operation of the electric motors 127 and 143a, respectively.

The output monitoring circuits 308 and 309 detect the driving current flowing between the driving circuits 306 and 307 and the electric motors 127 and 143a, respectively, and output a driving current signal to the CPU 305.

The motor power interrupt circuits 310 and 311 supply power from motor power sources to the driving circuits 306 and 307, respectively.

When receiving an abnormality signal from the CPU 305, the motor power interrupt circuits 310 and 311 cut off the supply of power from the motor power sources to the driving circuits 306 and 307. The throttle valve opening sensor 144, throttle grip opening sensor 150, the clutch sensor 201 and the vehicle speed sensor 203 serve as detecting sections for detecting the operating conditions of the vehicle.

The control operation in the two-wheeled motor vehicle 101 in normal times will be described.

In the two-wheeled motor vehicle 101, when the rider operates the throttle grip 149, the angle through which the throttle grip 149 is operated is detected by the throttle grip opening sensor 150 and a throttle operation angle detection signal is inputted into the CPU 305 in the control unit 200. The opening of the throttle valves 142 is detected by the throttle valve opening sensor 144, and a throttle opening detection signal is inputted into the CPU 305 in the control unit 200.

The CPU 305 outputs a control signal for controlling the operation of the electric motor 143a in the electric driving mechanism 143 to the driving circuit 308 based on the throttle operation angle detection signal inputted from the throttle grip opening sensor 150 and the throttle opening detection signal inputted from the throttle valve opening sensor 144.

The driving circuit 306 controls the on and off of the transistors FET1 to FET4 based on the control signal inputted from the CPU 305 to rotate the electric motor 143a in the forward or reverse direction so that the electric valves 142 can be opened or closed to a desired opening position.

In the two-wheeled motor vehicle 101, when the rider operates the shift switch 205, a shift position signal is inputted into the CPU 305 in the control unit 200. The operating condition of the clutch 170 is detected by the clutch sensor 201 and a clutch position detection signal is inputted into the CPU 305 in the control unit 200.

The CPU 305 outputs a control signal for controlling the operation of the clutch 170 to the driving circuit 307 based on the shift position signal inputted from the shift switch 205 and the clutch position detection signal inputted from the clutch sensor 201.

The driving circuit 307 controls the on and off of the transistors FET1 to FET4 based on the control signal inputted from the CPU 305 to rotate the electric clutch motor 127 in the forward or reverse direction in order to control the connection and disconnection of the clutch 170. To connect the clutch 170, the driving circuit 307 controls the driving force of the electric clutch motor 127 so that the clutch plate and friction plate can be pressed gradually in the direction to be coupled to the drive shaft (not shown) by the pressing force of the clutch spring and power can be gradually transmitted from the engine unit 107 to the transmission 122.

To disconnect the clutch 170, the driving circuit 307 releases the pressing force of the clutch spring with the driving force of the electric clutch motor 127 to move the clutch plate and friction plate in the direction away from the drive shaft so that the transmission of power from the engine unit 107 to the transmission 122 can be cut off.

The control operation in the two-wheeled motor vehicle 101 at the time when the CPU 305 has a failure will be described.

When detecting an abnormality in the operation, the CPU 305 outputs interrupt signals to the motor power interrupt circuits 310 and 311 and outputs mode switching signals to the driving circuits 306 and 307. When receiving the interrupt signals from the CPU 305, the motor power interrupt circuits 310 and 311 cut off the supply of power from motor power sources 1 and 2 to the driving circuits 306 and 307.

When the motor power interrupt circuits 310 and 311 cut off the supply of power from the motor power sources and the driving circuits 306 and 307 receive the mode switching signals from the CPU 305, the transistors FET1 and FET2 are turned on and the transistors FET3 and FET4 are turned off as shown in FIG. 4 (c) to shift the driving circuits 306 and 307 to the brake mode in order to prevent rapid rotation of the electric motors 127 and 143a.

Thus, when the CPU 305 detects an abnormality, the motor power interrupt circuits 310 and 311 cut off the supply of power from the motor power sources and the driving circuits 306 and 307 are shifted to the brake mode. Thus, the electric clutch motor 127 and the electric motor 143a in the electric driving mechanism 134 serve as electric generator.

In each electric motor, since a counter-electromotive force is generated and a current in the opposite direction is produced, a torque in the direction opposite the rotating direction of the electric motor is generated and serves as a brake.

Then, the electric clutch motor 127 is shifted to the brake mode and an abrupt action of the clutch 170 is prevented. Also, the electric motor 143a is shifted to the brake mode and an abrupt action of the throttle valves 142 is prevented. After that, the rider can open or close the throttle valve 142 manually by operating the throttle grip 149.

As described above, when the CPU 305 detects an abnormality, a rapid rotation of the electric motors 127 and 143a can be prevented to prevent rapid actions of the clutch 170 and the throttle valves 142.

Thus, it is possible to prevent a sudden change in the behavior of the two-wheeled motor vehicle 101 and a change in the operability for the rider.

The control operation in the two-wheeled motor vehicle 101 at the time when any of the sensors 144, 150 and 201 and the switch 205 has a failure will be described.

When detecting an abnormality in a throttle opening detection signal or throttle operation angle detection signal inputted from the input circuit 301 or 302, the CPU 305 determines that the throttle valve opening sensor 144 or the throttle grip opening sensor 150 has a failure and outputs an interrupt signal to the motor power interrupt circuit 310 and a mode switching signal to the driving circuit 306. When receiving the interrupt signal from the CPU 305, the motor power interrupt circuit 310 cuts off the supply of power from the motor power source to the driving circuit 306.

When the motor power interrupt circuit 310 cuts off the supply of power from the motor power source and the driving circuit 306 receives the mode switching signal from the CPU 305, the transistors FET1 and FET2 are turned on and the transistors FET3 and FET4 are turned off as shown in FIG. 4 (c) to shift the driving circuit 306 to the brake mode in order to prevent rapid rotation of the electric motor 143a.

Thus, when the throttle valve opening sensor 144 or the throttle grip opening sensor 150 has a failure, the motor power interrupt circuit 310 cuts off the power supply from the motor power source and the driving circuit 306 is shifted to the brake mode. Then, the electric motor 143a in the electronic driving mechanism 143 serves as an electric generator, and a counter-electromotive force is generated and a current in the opposite direction is produced. By the current, a torque in a direction opposite to the rotating direction of the electric motor 143a is generated and serves as a brake.

As a result, when the throttle valve opening sensor 144 or the throttle grip opening sensor 150 has a failure, rapid rotation of the electric motor 143a can be prevented to prevent an abrupt action of the throttle valve 142, and a sudden change in the behavior of the two-wheeled motor vehicle 101 can be prevented.

As a result, the rider does not feel discomfort and a change in the operability.

When detecting an abnormality in a clutch position detection signal inputted from the input circuit 304, the CPU 305 determines that the clutch sensor 201 has a failure and outputs an interrupt signal to the motor power interrupt circuit 311 and outputs a mode switching signal to the driving circuit 307. When receiving the interrupt signal from the CPU 305, the motor power interrupt circuit 311 cuts off the power supply from the motor power source to the driving circuit 307.

When the motor power interrupt circuit 311 cuts off the supply of power from the motor power source and the driving circuit 307 receives the mode switching signal from the CPU 305, the transistors FET1 and FET2 are turned on and the transistors FET3 and FET4 are turned off as shown in FIG. 4 (c) to shift the driving circuit 307 to the brake mode in order to prevent rapid rotation of the electric clutch motor 127.

Thus, when the clutch sensor 201 has a failure, the motor power interrupt circuit 311 cuts off the supply of power from the motor power source and the driving circuit 307 is shifted to the brake mode. Then, the electric clutch motor 127 serves as an electric generator, and a counter-electromotive force is generated and a current in the opposite direction is produced. By the current, a torque in a direction opposite to the rotating direction of the electric clutch motor 127 is generated and serves as a brake.

As a result, when the clutch sensor 201 has a failure, rapid rotation of the electric clutch motor 127 can be prevented to prevent an abrupt action of the clutch 170, and a sudden change in the behavior of the two-wheeled motor vehicle 101 can be prevented.

As a result, the rider does not feel discomfort and a change in the operability.

When detecting an abnormality in a shift position detection signal inputted from the input circuit 303, the CPU 305 determines that the shift switch 205 has a failure and outputs an interrupt signal to the motor power interrupt circuit 311 and outputs a mode switching signal to the driving circuit 307. When receiving the interrupt signal from the CPU 305, the motor power interrupt circuit 311 cuts off the power supply from the motor power source to the driving circuit 307.

As described previously, in the two-wheeled motor vehicle 101, when any of the sensors 144, 150 and 201 and the switch 205 has a failure, the supply of power from the motor power sources to the driving circuits 306 and 307 for driving the electric motors 143a and 127 is cut off and then the electric motors 143a and 127 are shifted to the brake mode by the driving circuits 306 and 307.

Thus, when the control system has a failure, an abrupt action of the throttle valve or the clutch caused by rapid rotation of the electric motors can be prevented and a sudden change in the behavior of the two-wheeled vehicle can be prevented. As a result, the rider does not feel discomfort and a change in the operability. Also, since there is no need to provide a further additional mechanism in the driving system or an additional circuit in the control system, the above function can be achieved at a low cost.

Figure 18:
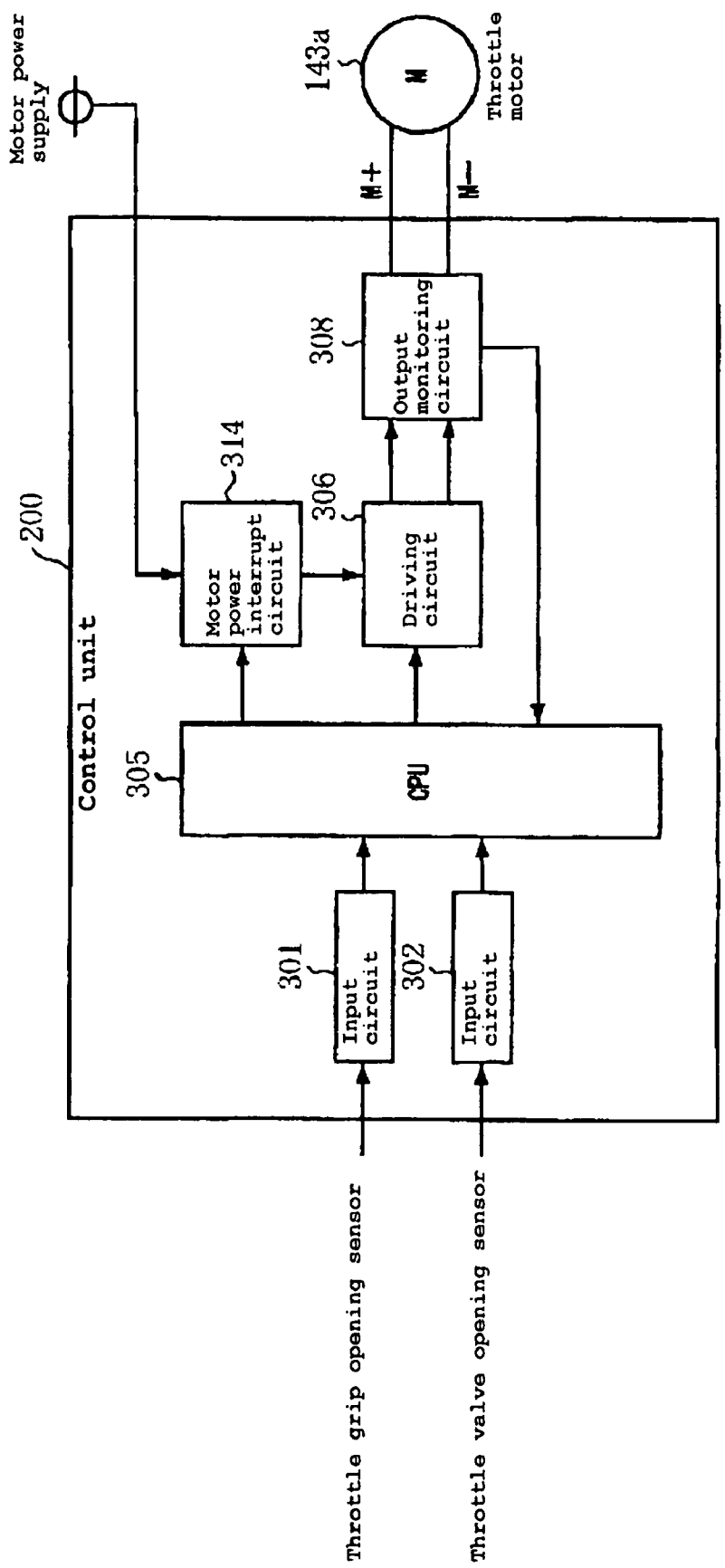
FIG. 18 is a view, illustrating another configuration of the control unit in the present invention.

Although a plurality of driving circuits for the electric motors are provided in the control unit 200 as shown in FIG. 17, the present invention is not limited to the configuration. For example, the driving circuit 306 for the electric motor 143a is provided in the control unit 200 as shown in FIG. 18, and another control unit having the same configuration may be provided for the electric motor 127.

Figure 19:
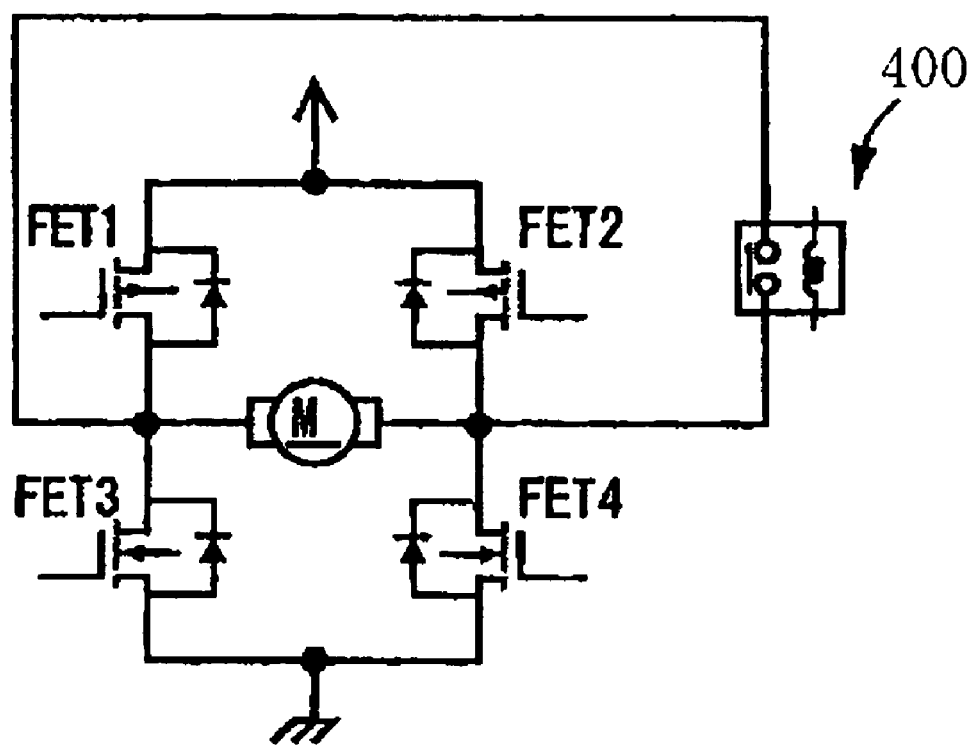
FIG. 19 is a view, illustrating a configuration of a control circuit for an electric motor in the present invention.

In the above example, since each driving circuit is constituted of an H-bridge circuit having transistors FET1 to FET4, a failure of any of the transistors FET1 to FET4 may make the shift to the brake mode difficult. Thus, a relay circuit 400 for braking operation may be connected to the H-bridge circuit as shown in FIG. 19.

In this case, in the event of a failure, the electric motor can be reliably shifted to the brake mode by cutting off the power supply from the motor power source to the driving circuit and activating the relay circuit 400. As a result, the reliability of the braking operation can be enhanced. As a device for use in the relay circuit 400 is not limited to a relay switch, a semiconductor device capable of a switching operation may be used.

Although the present invention is applied to a vehicle having an engine unit as a power source in the above example, this invention is not limited thereto. The present invention is applicable to a vehicle having an electric motor, for example, as a power source. Also, although the throttle mechanism has the electric driving mechanism 143 and the throttle operation mechanism 160 as driving sources, the spring for urging the throttle valves may be used as a driving source.

Although the case in which any of the sensors 144 and 150 and so on of the electronic throttle valve control system has a failure is described in the above example, the present invention is not limited thereto.

The control system of the present invention can react to any failure in the electronic throttle valve control system.

Although the present invention has been described in its preferred embodiments, the description is not for the purpose of limitation, and it is to be understood that various modifications can be made. The two-wheeled motor vehicle in the embodiments means a motorcycle, including every motor bike and motor scooter, and, more particularly, is a vehicle which can be turned by tilting the vehicle body. Thus, a vehicle, equipped with two or more front wheels and/or two or more rear wheels, that is, having three or four (or more) wheels in total, is also included in the "two-wheeled motor vehicle."

INDUSTRIAL APPLICABILITY

According to the present invention, there can be provided an electronic throttle valve control system which needs no additional housing space and can prevent rapid rotation of a throttle valve when the control system has a failure.

The invention claimed is:

1. An electronic throttle valve control system comprising: a throttle valve for controlling the amount of intake air to an internal combustion engine;
an electric motor for driving the throttle valve; and
a control section for controlling the electric motor; wherein the throttle valve has an urging mechanism for urging the throttle valve in a closing direction;
the control section shifts the electric motor to a current generating mode to control a speed at which the throttle valve is rotated in the closing direction by an urging force of the urging mechanism when the control system has a failure; and
the control section cuts off a power from a power supply to the electric motor and then shifts the electric motor to the current generating mode.

2. The electronic throttle valve control system of claim 1, wherein the throttle valve is rotated in the closing direction by the urging force of the urging mechanism and then held in a predetermined opening position when the control system has a failure.

3. An electronic throttle valve control system comprising: a throttle valve for controlling the amount of intake air to an internal combustion engine;
an electric motor for driving the throttle valve; and
a control section for controlling the electric motor; wherein the throttle valve comprises a first urging mechanism for urging the throttle valve in a closing direction; and a second urging mechanism for urging the throttle valve in an opening direction,
the control section shifts the electric motor to a current generating mode to control a speed at which the throttle valve is rotated in the closing direction by a relative urging force of the first and second urging mechanisms when the control system has a failure, and
the control section cuts off a power from a power supply to the electric motor and then shifts the electric motor to the current generating mode.

4. The electronic throttle valve control system of claim 3, wherein the throttle valve is rotated in the closing or opening direction by the relative urging force of the first and second urging mechanisms and then held in a predetermined opening position when the control system has a failure.

5. The electronic throttle valve control system of claim 2, wherein the internal combustion engine is maintained in such a state that a failure operation can be conducted when the throttle valve is held in the predetermined opening position.

6. An electronic throttle valve control system comprising a throttle valve for controlling the amount of intake air to an internal combustion engine;
an electric motor for driving the throttle valve; and
a control section for controlling the electric motor, wherein the control section shifts the electric motor to a current generating mode to control a rotation of the throttle valve when the control system has a failure, and
the control section cuts off a power from a power supply to the electric motor and then shifts the electric motor to the current generating mode.

7. The electronic throttle valve control system of claim 6, wherein the throttle valve is held in an opening position where it is when the control system has a failure.

8. The electronic throttle valve control system of claim 1, wherein the urging mechanism comprises a spring.

9. The electronic throttle valve control system of claim 1, wherein the electronic throttle valve control system further comprises a throttle operation mechanism for use in driving the throttle valve manually so that the throttle valve can be rotated in the closing direction when the control system has a failure.

10. A two-wheeled motor vehicle provided with the electronic throttle valve control system according to claim 1.

11. The electronic throttle valve control system of claim 4, wherein the internal combustion engine is maintained in such a state that a failure operation can be conducted when the throttle valve is held in the predetermined opening position.

12. The electronic throttle valve control system of claim 3, wherein the urging mechanism comprises a spring.

13. The electronic throttle valve control system of claim 3, wherein the electronic throttle valve control system further comprises a throttle operation mechanism for use in driving the throttle valve manually so that the throttle valve can be rotated in the closing direction when the control system has a failure.

14. The electronic throttle valve control system of claim 6, wherein the electronic throttle valve control system further comprises a throttle operation mechanism for use in driving the throttle valve manually so that the throttle valve can be rotated in a closing direction when the control system has a failure.

15. A two-wheeled motor vehicle provided with the electronic throttle valve control system according to claim 3.

16. A two-wheeled motor vehicle provided with the electronic throttle valve control system according to claim 6.

17. The electronic throttle valve control system of claim 1, further comprising a detecting section for detecting a vehicle operating condition, wherein the control section cuts off the power from the power supply to the electric motor when the detecting section detects an abnormality.

18. The electronic throttle valve control system of claim 17, wherein the detecting section is a throttle valve opening sensor.

19. The electronic throttle valve control system of claim 3, further comprising a detecting section for detecting a vehicle operating condition, wherein the control section cuts off the power from the power supply to the electric motor when the detecting section detects an abnormality.

20. The electronic throttle valve control system of claim 19, wherein the detecting section is a throttle valve opening sensor.

21. The electronic throttle valve control system of claim 6, further comprising a detecting section for detecting a vehicle operating condition, wherein the control section cuts off the power from the power supply to the electric motor when the detecting section detects an abnormality.

22. The electronic throttle valve control system of claim 21, wherein the detecting section is a throttle valve opening sensor.

23. An electronic throttle valve control system comprising:
a throttle valve for controlling the amount of intake air to an internal combustion engine;
an electric motor for driving the throttle valve; and
a control section for controlling the electric motor; wherein
the throttle valve has an urging mechanism for urging the throttle valve in a closing direction; and
the control section shifts the electric motor to a current generating mode to control a speed at which the throttle valve is rotated in the closing direction by an urging force of the urging mechanism when the control system has a failure.

24. An electronic throttle valve control system comprising:
a throttle valve for controlling the amount of intake air to an internal combustion engine;
an electric motor for driving the throttle valve; and
a control section for controlling the electric motor; wherein
the throttle valve comprises a first urging mechanism for urging the throttle valve in a closing direction; and a second urging mechanism for urging the throttle valve in an opening direction, and
the control section shifts the electric motor to a current generating mode to control a speed at which the throttle valve is rotated in the closing direction by a relative urging force of the first and second urging mechanisms when the control system has a failure.

25. An electronic throttle valve control system comprising
a throttle valve for controlling the amount of intake air to an internal combustion engine;
an electric motor for driving the throttle valve; and
a control section for controlling the electric motor, wherein
the control section shifts the electric motor to a current generating mode to control a rotation of the throttle valve when the control system has a failure.

* * * * *